United States Patent
Moncada

(10) Patent No.: US 11,544,514 B2
(45) Date of Patent: Jan. 3, 2023

(54) SMART CARD SYSTEM FOR HOLDING MULTIPLE SMART CARDS

(71) Applicant: Camilo Moncada, Gresham, OR (US)

(72) Inventor: Camilo Moncada, Gresham, OR (US)

(\*) Notice: Subject to any disclaimer, the term of this patent is extended or adjusted under 35 U.S.C. 154(b) by 10 days.

(21) Appl. No.: 17/172,905

(22) Filed: Feb. 10, 2021

(65) Prior Publication Data

US 2021/0256339 A1   Aug. 19, 2021

Related U.S. Application Data

(60) Provisional application No. 62/975,756, filed on Feb. 13, 2020.

(51) Int. Cl.
*G06K 19/07* (2006.01)
(52) U.S. Cl.
CPC .................. *G06K 19/0721* (2013.01)
(58) Field of Classification Search
CPC ................ G06K 19/0721; G06K 19/07739
See application file for complete search history.

(56) References Cited

U.S. PATENT DOCUMENTS

| | | | |
|---|---|---|---|
| 5,221,838 A | 6/1993 | Gutman et al. | |
| 8,567,459 B2* | 10/2013 | Kitchen | A45C 11/182 150/147 |
| 10,026,077 B2* | 7/2018 | Hosny | G06K 19/07 |
| 2009/0065587 A1 | 3/2009 | Phillips | |
| 2009/0134223 A1 | 5/2009 | Matthews et al. | |
| 2011/0019367 A1* | 1/2011 | Hatch | G06K 19/072 361/737 |
| 2020/0082236 A1* | 3/2020 | Faulwetter | G06K 19/0721 |

FOREIGN PATENT DOCUMENTS

WO   WO-2012/069789 A1   5/2012

OTHER PUBLICATIONS

International Search Report and Written Opinion on International Patent Application No. PCT/US2021/017974 dated Jun. 15, 2021 (12 pages).

\* cited by examiner

*Primary Examiner* — Seung H Lee
(74) *Attorney, Agent, or Firm* — Foley & Lardner LLP

(57) ABSTRACT

A smart card wallet for holding a plurality of smart cards. The smart card wallet comprises a front surface plate; a back surface plate; a communication interface configured to receive instructions from a transaction terminal; a switch coupled to the communication interface; an internal core coupled between the front surface plate and the back surface plate, the internal core comprises: a first cavity configured to hold a first smart card that stores one or more sets of information associated with a first account of a user; a second cavity configured to hold a second smart card that stores one or more sets of information associated with a second account of the user, wherein the switch is configured to provide the instructions to the first smart card by electrically coupling the communication interface to the first smart card while the second card remains disabled.

19 Claims, 19 Drawing Sheets

SMART CARD SYSTEM FOR HOLDING MULTIPLE SMART CARDS

TECHNICAL FIELD

The disclosure relates generally to smart cards and, more particularly, to a system and method for combining multiple smart cards into a single card.

BACKGROUND

Currently, there are few solutions for consolidating smart chip card. Some of these solutions are costly and fail to meet the needs of the industry because of their complexity and tech savvy required to use. Other solutions attempt to memorize your cards and store them, but again are difficult to adopt by people and institutions that are not diverse in the technology.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, the present disclosure is directed to a smart card wallet (sometimes referred to as, "smart chip card system") for holding a plurality of smart cards. In some embodiments, the smart card wallet includes a front surface plate; a back surface plate; a communication interface configured to receive instructions from a transaction terminal; and/or a switch coupled to the communication interface. In some embodiments, the smart card wallet includes an internal core coupled between the front surface plate and the back surface plate. In some embodiments, the internal core includes a first cavity configured to hold a first smart card that stores one or more sets of information associated with a first account of a user and/or a second cavity configured to hold a second smart card that stores one or more sets of information associated with a second account of the user. In some embodiments, the switch is configured to provide the instructions to the first smart card by electrically coupling the communication interface to the first smart card while the second card remains disabled.

In one aspect, the present disclosure is directed to a smart card wallet (sometimes referred to as, "smart chip card system") for holding a plurality of smart cards. In some embodiments, the smart card wallet includes a front surface plate; a back surface plate; and/or an internal core coupled between the front surface plate and the back surface plate. In some embodiments, the internal core includes a first cavity configured to hold a first smart card that stores one or more sets of information associated with a first account of a user; a second cavity configured to hold a second smart card that stores one or more sets of information associated with a second account of the user; and/or a communication interface configured to receive instructions from a transaction terminal. In some embodiments, the smart card wallet includes a first blocker door configured to allow the first smart card to receive the instructions from the communication interface during a predetermined window of time; and a second blocker door configured to prevent the second smart card from receiving the instructions from the communication interface during the predetermined window of time.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Figure 1:
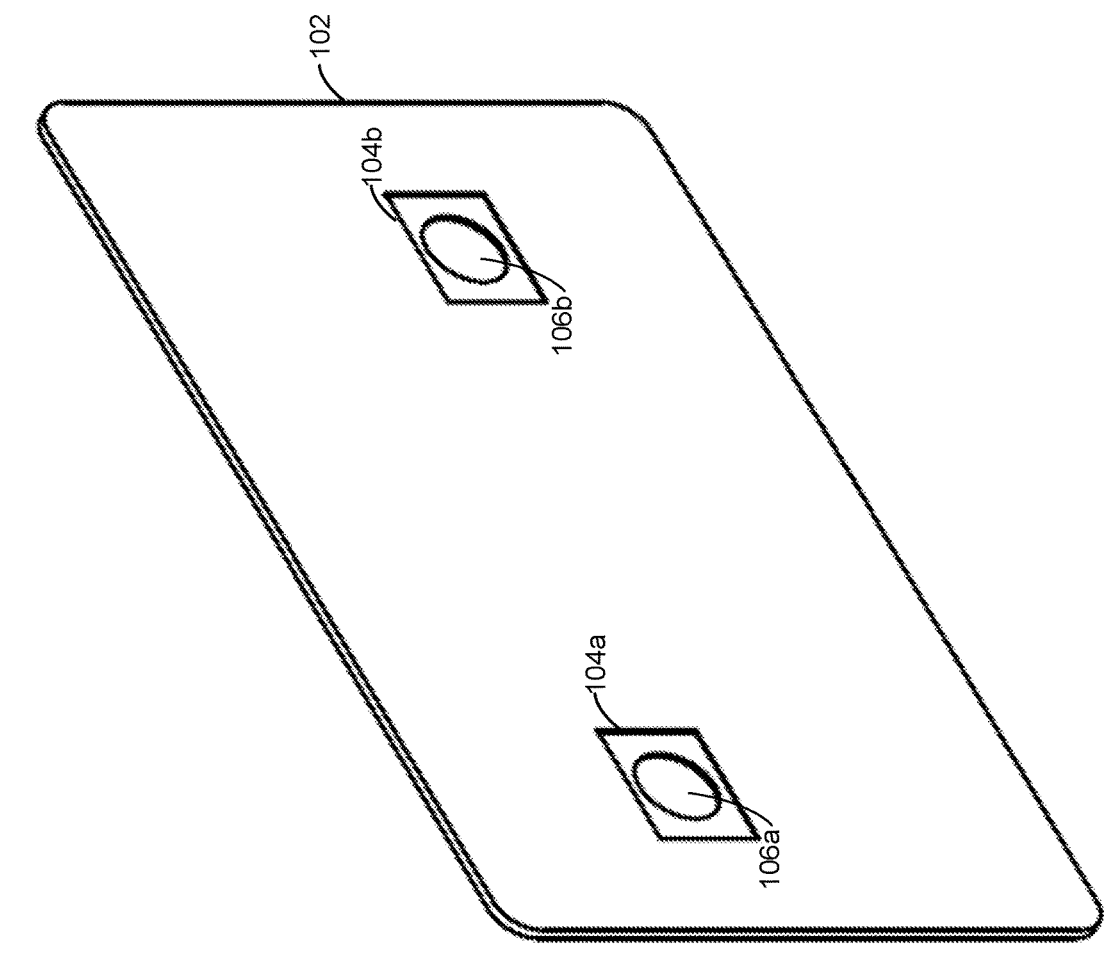
FIG. 1 is a block diagram depicting an example smart chip card system configured to hold a plurality of EMV chips, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

It is desirable to have one card (e.g., a banking card, a charge card, a debit and/or credit card, a gym card, a medical card, a parking card, a public transportation card, etc.) that is configured to hold multiple smart chips, where each smart chip is associated (e.g., linked, paired) with one or more accounts (e.g., a banking account, a gym account, a health and/or medical account, an insurance account, a school account, a government account, a library account, work and/or security entry account, a meal account, a reward account, a parking account, a public transportation account, etc.) of a user. This would be easier to carry and more efficient for organizing different accounts. Furthermore, it is desirable to have a system that is customizable to an individual's needs. Still, further, it is desirable to only have one card to keep track of in the event of theft or loss. One card would also have a positive impact on manufacturing as it would be less wasteful in materials. Thus, a multiple smart chip card system would have many advantages over single-use cards and bring added value to both the card institutions and the card holders.

Accordingly, the present disclosure is directed to systems and methods for combining multiple smart cards (e.g., sometimes referred to as, "an integrated circuit card" or "chip card") into a single card, thereby allowing a user to perform (e.g., execute, complete, carry out) transactions using a plurality of accounts that are associated with the user.

In various example implementations, as described in the below passages, a smart chip card system may be configured to hold multiple smart chips, where each smart chip is associated with one or more banks and/or banking accounts. In some embodiments, the smart chip card system may be sized to fit into a wallet. In some embodiments, a smart chip card system may be configured as a 4-in-1 smart chip card system in that it may hold 4 smart chips. In some embodiments, a smart chip card system may include a magnetic stripe. In some embodiments, a smart chip card system may include a smart chip configured as a Europay, Mastercard, and Visa (EMV) smart chip and/or a smart chip configured as a contactless-enabled (e.g., NFC) smart chip, where each smart chip is associated with one or more accounts of a user. For example, a smart chip card system may include a first smart chip that is associated with a first set of banking accounts and a second smart chip that is associated with a second set of banking accounts. In some embodiments, the first set of banking accounts may be different than the second set of banking accounts. In some embodiments, a smart chip may include a metal contact plate that provides access to a terminal (e.g., a transaction terminal) to read information stored in the smart chip. For example, a terminal can send instructions to a smart chip via the metal contact plate to cause the smart chip to provide the information stored in the smart chip to the terminal. In some embodiments, the metal contact plate is on the top or bottom side of the smart chip, but no metal contact plate is on the opposing side of the smart chip. As such, a terminal can only read the smart chip using the metal plates if the metal plates are facing and/or touching the terminal.

A smart chip card system that is capable of holding multiple smart cards may be less expensive and easy to customize, as compared to the conventional/standard banking card that is associated with a single bank. A smart chip card system is an intuitive (e.g., low technical knowhow needed to operate), low-cost solution (e.g., $10 or less retail) to save space in the wallet. Furthermore, by miniaturizing the standard card size to a micro card size, it reduces the use of raw materials (e.g., plastic and/or other materials) needed to manufacture by 90% or more, saving in cost, and/or in environmental impact.

In some embodiments, a smart chip card system may be configured as an 8-in-1 smart chip card system that may hold smart chips. In some embodiments, an 8-in-1 smart chip card system may lose the redundancy of having a magnetic stripe enabled card, but gain the ability to have 8 accounts on one card, each with a chip and contactless pay system (EMV and NFC).

In various example implementations, as described in the below passages, a smart chip system may include one or more of the following components and/or features: (1) a plurality of smart chip holders and/or cavities that are each configured to hold a smart chip, (2) one or more magnetic stripes that are each associated with a respective smart chip held by the smart chip system; (3) a Radio Frequency Identification (RFID) circuitry and/or one or more antennas (sometimes referred to as, "a communication interface"); (4) a Near-Field Communication (NFC) circuitry and/or one or more antennas; (5) one or more contactless smart chips; (6) an RFID blocker and/or shield, and/or (7) manufactured with components that are common to industry with smart chips at opposing ends and/or opposing sides of card and/or both in required location common to industry standards.

Non-limiting example configurations of the smart chip system may include: (1) a smart chip system configuration having two smart chips on front of the smart chip system at opposite ends; (2) a smart chip system configuration having two smart chips on front of the smart chip system at opposite ends with a designated magnetic strip associated to each and one or more of the smart chips that is contactless compatible; (3) a smart chip system configuration having two smart chips on opposite side of the smart chip system, front and back with a designated magnetic strip associated to each and one or more of the smart chips that is contactless compatible; (4) a smart chip system configuration having two smart chips on front and two more smart chips on back and two magnetic strips and one or more of the smart chips that is contactless compatible making for a total of four smart chips on one the smart chip system; (5) a smart chip system configuration (e.g., square) having four smart chips on front and/or with the option of adding four more smart chips on back and one or more of the smart chips that is contactless compatible making a total of eight smart chips on the smart chip system; (6) a smart chip system configuration (sometimes referred to as, "split") having two smart chips on front of the smart chip system; (7) a smart chip system configuration (sometimes referred to as, "Flip-On") having a smart chip on the front of the smart chip system and a smart chip on the back of the smart chip system; (8) a smart chip system configuration (sometimes referred to as, "Four+Eight") having four smart chips on the front and/or four smart chips on the back of the smart chip system allowing for a total of eight smart chips on the smart chip system; and (9) a smart chip system configuration (sometimes referred to as, "Four+Two") having two smart chips on the opposing ends of the front of the smart chip system and/or two smart chips on the opposing ends of the back of the smart chip system.

In some embodiments, a smart chip system is unique when compared with other known systems and solutions in that it provides an easy way to consolidate many smart chip cards into one card in an affordable and adoptable way for card institutions and card holders. In some embodiments, the disclosed system is superior in that the overall architecture of the smart chip system is unique. More specifically, the system is unique due to the presence of multiple smart chip constructions and/or configurations that can meet the different needs of a card holder and/or card issuer.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The multiple smart chip card may, however, be embodied in many different forms and should not be construed as being limited to the embodiments set forth herein; rather, these embodiments are provided by way of illustration only and so that this disclosure will be thorough, complete and fully convey understanding to those skilled in the art.

FIG. 1 is a block diagram depicting an example smart chip card system configured to hold a plurality of EMV chips, in accordance with some embodiments of the present disclosure. The smart chip card system 102 includes a front surface plate (e.g., a card, a plane), a back surface plate, and an interior core that is coupled (e.g., attached, adhered, a part of) between the front surface plate and the back surface plate. In some embodiments, the front surface plate and/or the back surface plate may be made of plastic, cardboard, paper, and/or metal. The smart chip card system 102 includes a smart chip holder 104a (e.g., a cavity, a space, a void) that is configured to hold an EMV smart chip (not shown in FIG. 1) that is associated with a first account of a user of the smart chip card system 102. The smart chip card system 102 includes a smart chip holder 104b that is configured to hold an EMV smart chip (not shown in FIG. 1) that is associated with a second account of the user. In some embodiments, the first account and the second account correspond to different accounts of the user. In some embodiments, a smart chip holder is included and/or contained within the interior core.

The smart chip holder 104a includes a cutout 106a providing an additional depth in the smart chip holder 104a to accommodate connections and a smart chip (e.g., microchip of EMV chip). The smart chip holder 104b includes a cutout 106b providing an additional depth in the smart chip holder 104b to accommodate connections and a smart chip (e.g., microchip of EMV chip). In some embodiments, the cutout 106a and/or the cutout 106b may be any size and shape (e.g., circle, oval, rectangle, triangle, etc.).

Figure 2:
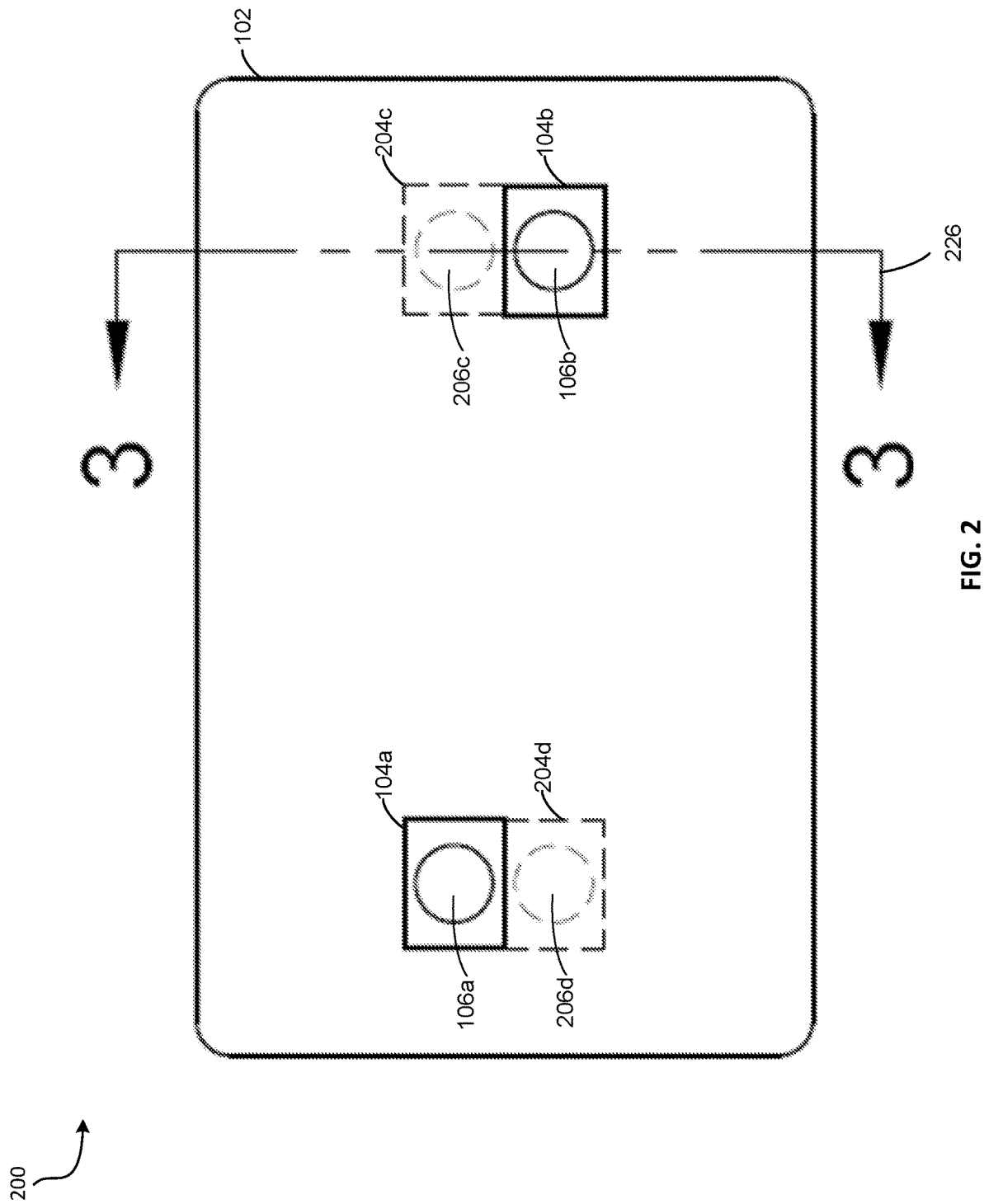
FIG. 2 is a block diagram depicting an example transparent view of smart chip card system 102 showing two EMV chips on the front and two EMV chips on the back, in accordance with some embodiments of the present disclosure.

FIG. 2 is a block diagram depicting an example transparent view of smart chip card system 102 showing two EMV chips on the front and two EMV chips on the back, in accordance with some embodiments of the present disclosure. The smart chip card system 102 includes a smart chip holder 204d (e.g., a cavity, a space, a void) that is configured to hold an EMV smart chip (e.g., a third EMV chip) that is associated with an account of a user of the smart chip card system 102. The transparent view 200 shows the back of the EMV smart chip in the smart chip holder 204d. The smart chip holder 204d includes a cutout 206d providing an additional depth in the smart chip holder 204d to accommodate connections and a smart chip (e.g., microchip of EMV chip).

The smart chip card system 102 includes a smart chip holder 204c (e.g., a cavity, a space, a void) that is configured to hold an EMV smart chip (e.g., a fourth EMV chip) that is associated with an account of a user of the smart chip card system 102. The transparent view 200 shows the back of the EMV smart chip in the smart chip holder 204c. The smart chip holder 204c includes a cutout 206c providing an additional depth in the smart chip holder 204c to accommodate connections and a smart chip (e.g., microchip of EMV chip).

Figure 3:
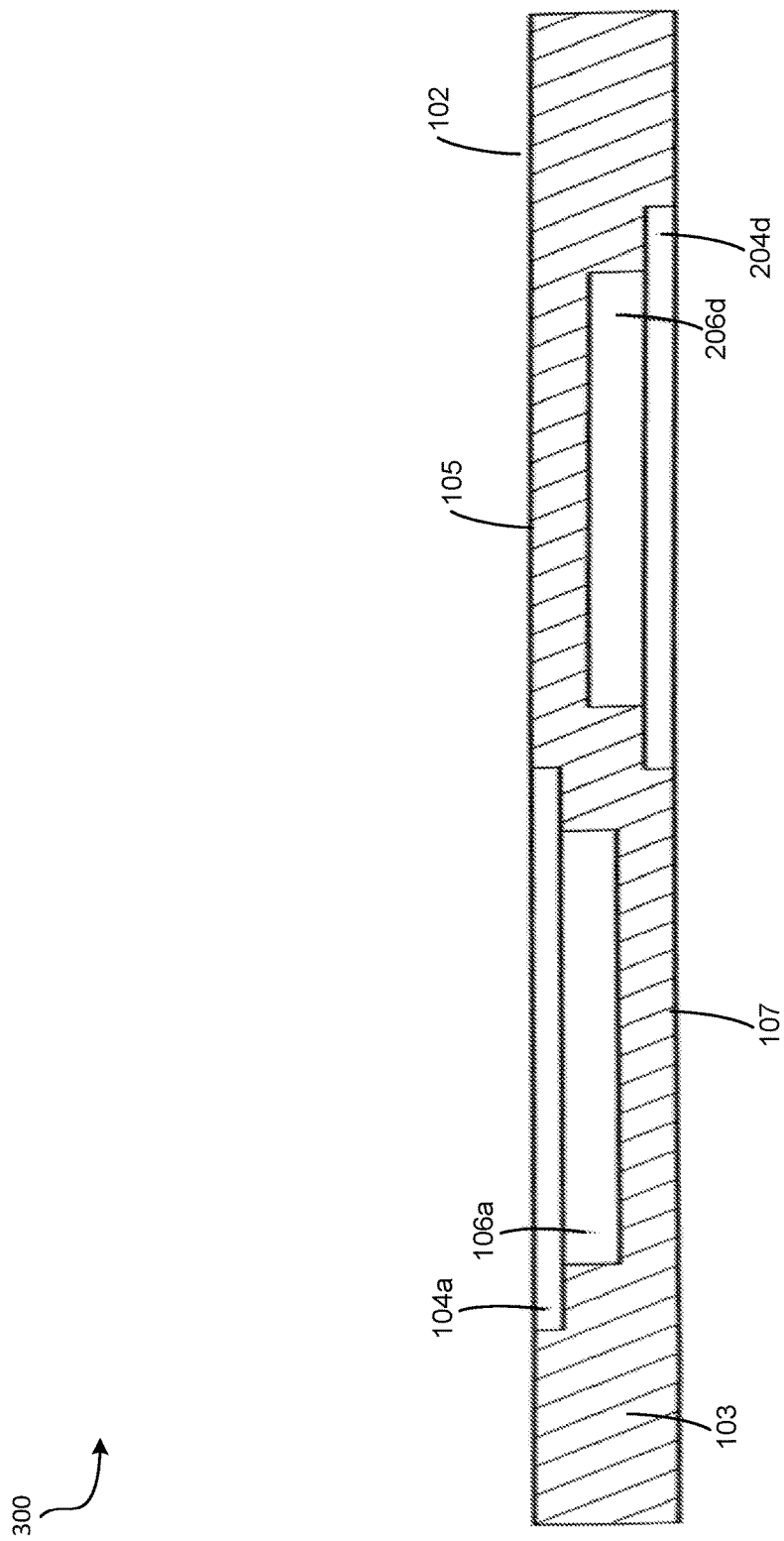
FIG. 3 is a block diagram depicting the cross-cut view the smart chip card system 102 corresponding to the sectional line 226, in accordance with some embodiments of the present disclosure.

The sectional line 226 corresponds to the location of the cross-cut view of FIG. 3.

FIG. 3 is a block diagram depicting the cross-cut view the smart chip card system 102 corresponding to the sectional line 226, in accordance with some embodiments of the present disclosure. The cross-cut view shows the interior core 103 that is coupled between the front surface plate 105 of the smart chip card system 102 and the back surface plate 107.

Figure 4:
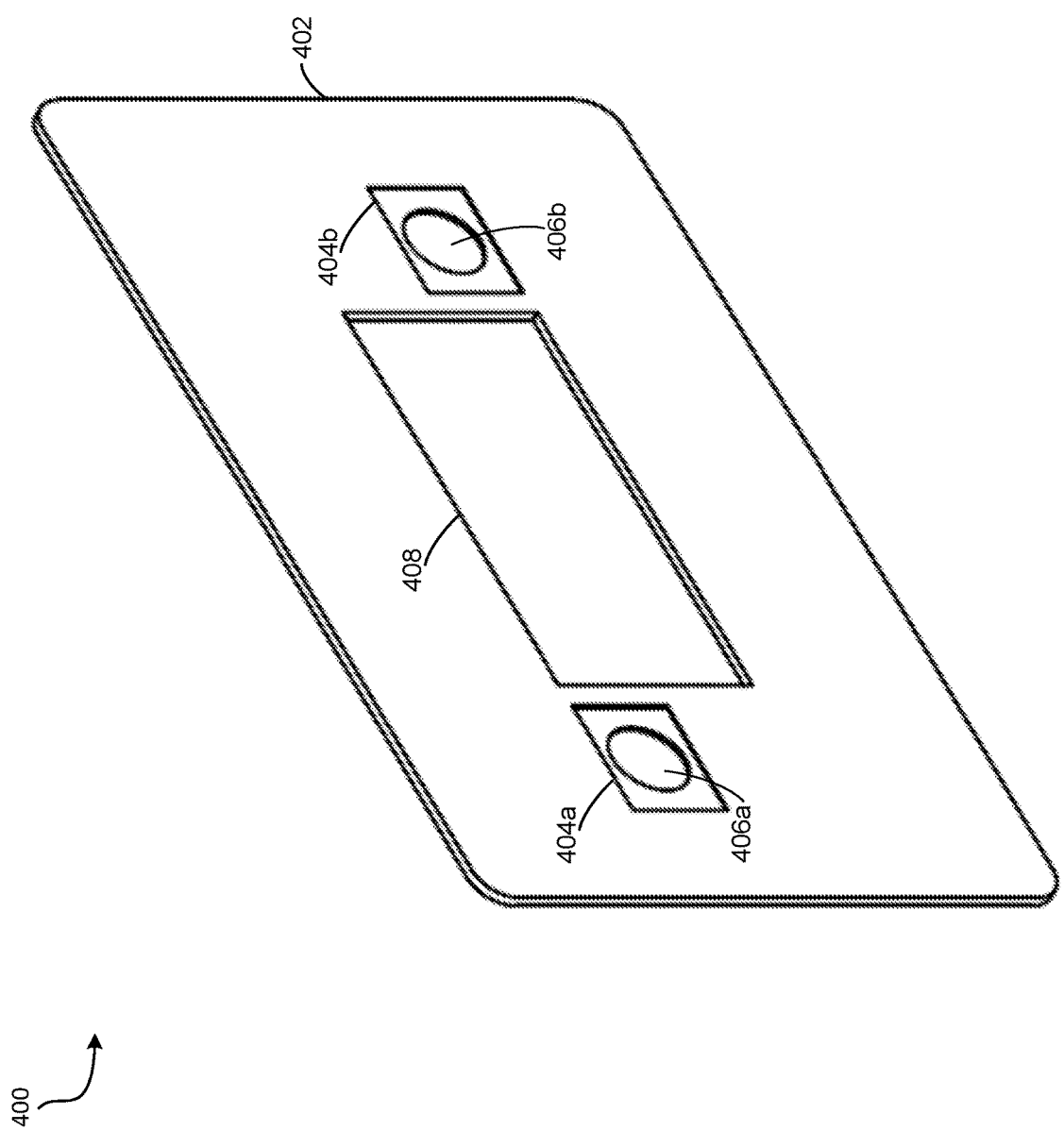
FIG. 4 is a block diagram depicting an example smart chip card system configured to hold a plurality of EMV chips, in accordance with some embodiments of the present disclosure.

FIG. 4 is a block diagram depicting an example smart chip card system configured to hold a plurality of EMV chips, in accordance with some embodiments of the present disclosure. The smart chip card system 402 includes a front surface plate (e.g., a card, a plane), a back surface plate, and an interior core that is coupled (e.g., attached, adhered) between the front surface plate and the back surface plate. The smart chip card system 402 includes a smart chip holder 404a that is configured to hold an EMV smart chip (not shown in FIG. 1) that is associated with a first account of a user of the smart chip card system 402. The smart chip card system 402 includes a smart chip holder 404b that is configured to hold an EMV smart chip (not shown in FIG. 1) that is associated with a second account of the user. In some embodiments, the first account and the second account correspond to different accounts of the user. In some embodiments, a smart chip holder is included and/or contained within the interior core. In some embodiments, the smart chip system 402 may be rectangular in shape, where the length may be 85 mm+/−20% and the width may be 54 mm+/−20%.

The smart chip holder 404a includes a cutout 406a providing an additional depth in the smart chip holder 404a to accommodate connections and a smart chip (e.g., microchip of EMV chip). The smart chip holder 404b includes a cutout 406b providing an additional depth in the smart chip holder 404b to accommodate connections and a smart chip (e.g., microchip of EMV chip). In some embodiments, the cutout 406a and/or the cutout 406b may be any size and shape (e.g., circle, oval, rectangle, triangle, etc.).

The smart chip holder 404a includes an interior cutout 408 that reduces the amount of material (e.g., plastic or metal) to manufacture the smart chip holder 404a by as much as 25% or more. In some embodiments, the interior cutout 408 may reduce the cost and/or environmental impact of raw materials needed to manufacture the smart chip holder 404a. In some embodiments, the interior cutout 408 may reduce the weight of smart chip holder 404a, making it easier to carry the smart chip holder 404a, for example, in a wallet, purse, or backpack. In some embodiments the interior cutout may be rectangular in shape, where the length may be 45 mm+/−20% and the width may be 28 mm+/−20%.

Figure 5:
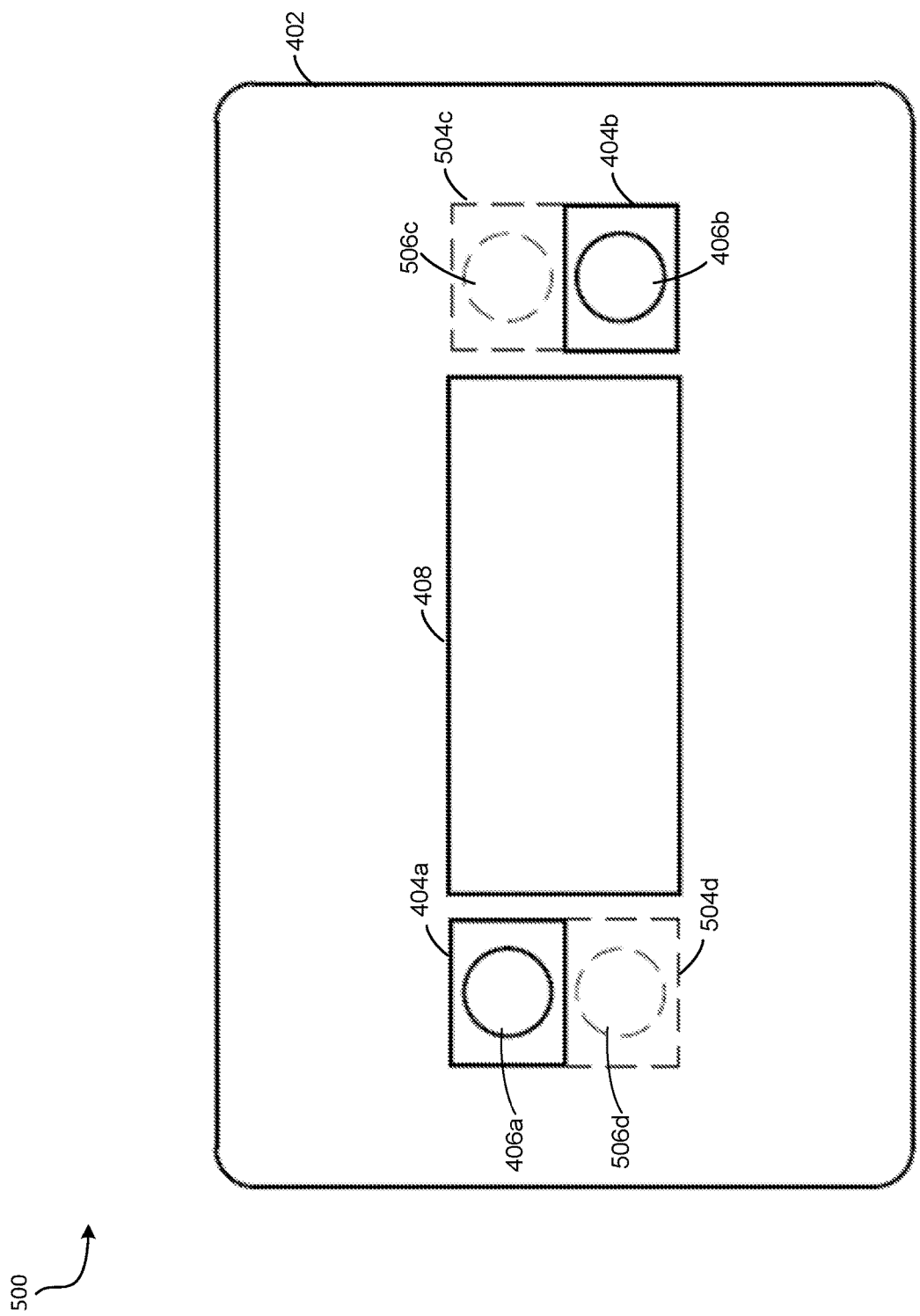
FIG. 5 is a block diagram depicting an example transparent view of smart chip card system 402 showing two EMV chips on the front and two EMV chips on the back, in accordance with some embodiments of the present disclosure.

FIG. 5 is a block diagram depicting an example transparent view of smart chip card system 402 showing two EMV chips on the front and two EMV chips on the back, in accordance with some embodiments of the present disclosure. The smart chip card system 502 includes a smart chip holder 504d (e.g., a cavity, a space, a void) that is configured to hold an EMV smart chip (e.g., a third EMV chip) that is associated with an account of a user of the smart chip card system 402. The transparent view 500 shows the back of the EMV smart chip in the smart chip holder 504d. The smart chip holder 504d includes a cutout 506d providing an additional depth in the smart chip holder 504d to accommodate connections and a smart chip (e.g., microchip of EMV chip). The smart chip card system 402 includes a smart chip holder 504c (e.g., a cavity, a space, a void) that is configured to hold an EMV smart chip (e.g., a fourth EMV chip) that is associated with an account of a user of the smart chip card system 402. The transparent view 500 shows the back of the EMV smart chip in the smart chip holder 504c. The smart chip holder 504c includes a cutout 506c providing an additional depth in the smart chip holder 504c to accommodate connections and a smart chip (e.g., microchip of EMV chip).

Figure 6:
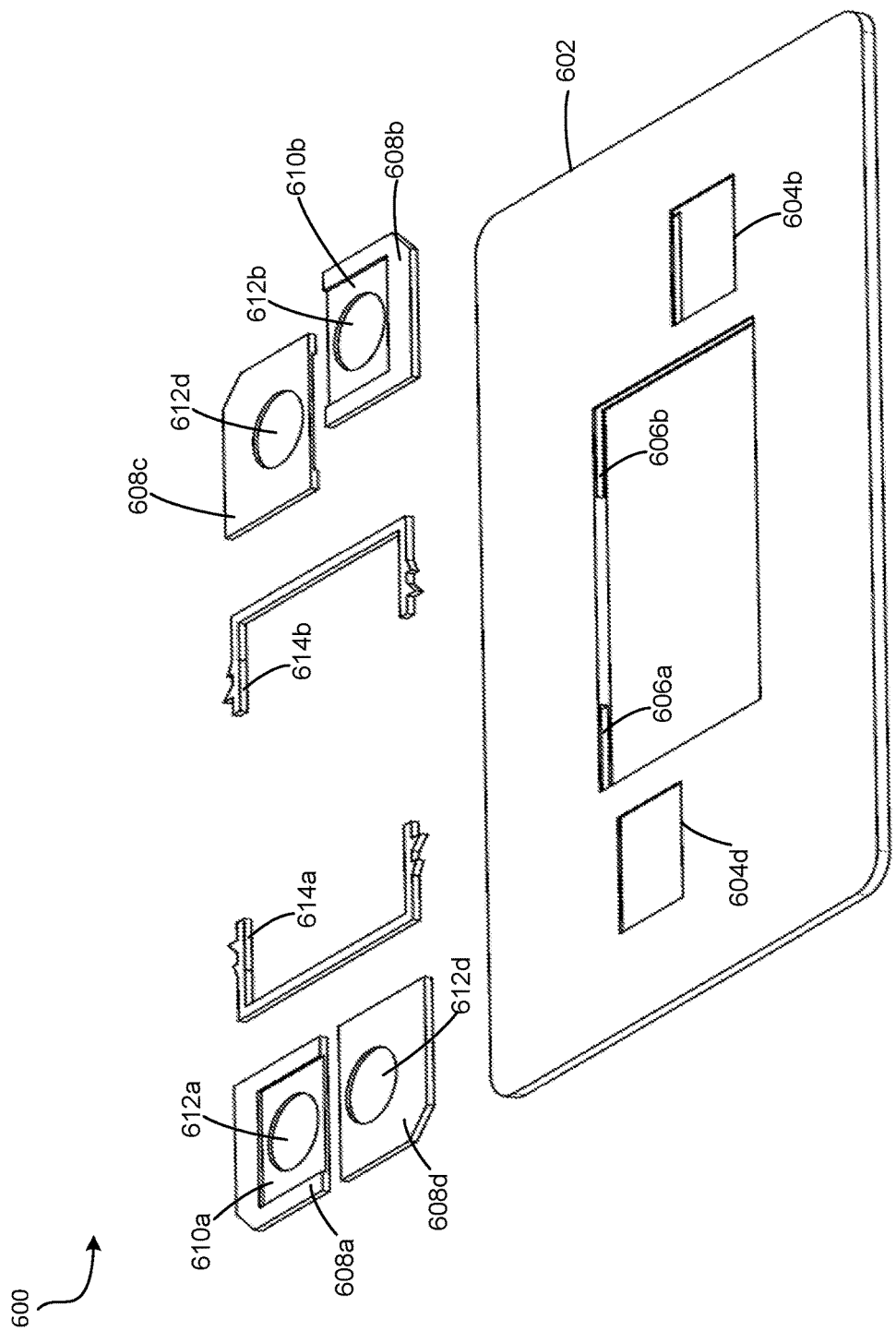
FIG. 6 is a block diagram depicting an example of a modular version of a smart chip card system configured to hold a plurality of EMV chips using retaining clips, in accordance with some embodiments of the present disclosure.

FIG. 6 is a block diagram depicting an example of a modular version of a smart chip card system configured to hold a plurality of EMV chips using retaining clips, in accordance with some embodiments of the present disclosure. The smart chip card system 602 includes a smart chip window 604b that is configured to expose (e.g., reveal) the contact surfaces of a micro EMV chip to allow an EMV card reader to read (e.g., access) the micro EMV chip. The smart chip card system 602 includes a smart chip window 604d that is configured to expose the contact surfaces of a micro EMV chip to allow an EMV card reader to read the micro EMV chip.

The smart chip card system 602 includes a front surface plate (e.g., a card, a plane), a back surface plate, and an interior core that is coupled (e.g., attached, adhered, a part of) between the front surface plate and the back surface plate. In some embodiments, the front surface plate and/or the back surface plate may be made or plastic, cardboard, paper, and/or metal.

The smart chip card system 602 includes a micro EMV chip body 608a (shown in FIG. 6 as facing right-side up) configured to hold an EMV chip in its center cavities. The micro EMV chip body 608a includes a smart chip card system 610a configured to place/insert an EMV chip into a cutout 612a. The cutout 612a is configured to provide an additional depth in the micro EMV chip body 608a to accommodate connections and a smart chip (e.g., microchip of EMV chip).

The smart chip card system 602 includes a micro EMV chip body 608d (shown in FIG. 6 as facing upside-down when inserted into 606a) configured to hold an EMV chip in its center cavities. The micro EMV chip body 608d includes a cutout 612a. The cutout 612a is configured to provide an additional depth in the micro EMV chip body 608a to accommodate connections and a smart chip (e.g., microchip of EMV chip).

The smart chip card system 602 includes a micro EMV chip body 608b (shown in FIG. 6 as facing right-side up) configured to hold an EMV chip in its center cavities. The micro EMV chip body 608b includes a smart chip card system 610b configured to place/insert an EMV chip into a cutout 612b. The cutout 612b is configured to provide an additional depth in the micro EMV chip body 608b to accommodate connections and a smart chip (e.g., microchip of EMV chip).

The smart chip card system 602 includes a micro EMV chip body 608c (shown in FIG. 6 as facing upside-down when inserted into 606b) configured to hold an EMV chip in its center cavities. The micro EMV chip body 608c includes a cutout 612c. The cutout 612c is configured to provide an additional depth in the micro EMV chip body 608c to accommodate connections and a smart chip (e.g., microchip of EMV chip).

The smart chip card system 602 includes pocket 606a that is a slot opening (e.g., cavity) sandwiched in the center or near (i.e., offset from) the center of the body of the smart chip card system 602 that allows a plurality (e.g., 2 or more) EMV chips to be inserted (i.e., one EMV chip for each side of the card). In some embodiments, the pocket 606a is positioned in the interior core of the smart chip card system 602. The smart chip card system 602 includes a retaining clip 614a for securing 608a and 608d into the pocket 606a. In some embodiments, the pocket 606a may have a thickness of 0.5 mm+/−20%.

The smart chip card system 602 includes pocket 606b that is a slot opening (e.g., cavity) sandwiched in the center or near (i.e., offset from) the center of the body of the smart chip card system 602 that allows a plurality (e.g., 2 or more) EMV chips to be inserted (i.e., one EMV chip for each side of the card). In some embodiments, the pocket 606b is positioned in the interior core of the smart chip card system 602. The smart chip card system 602 includes a retaining clip 614b for securing 608b and 608c into the pocket 606b.

Figure 7:
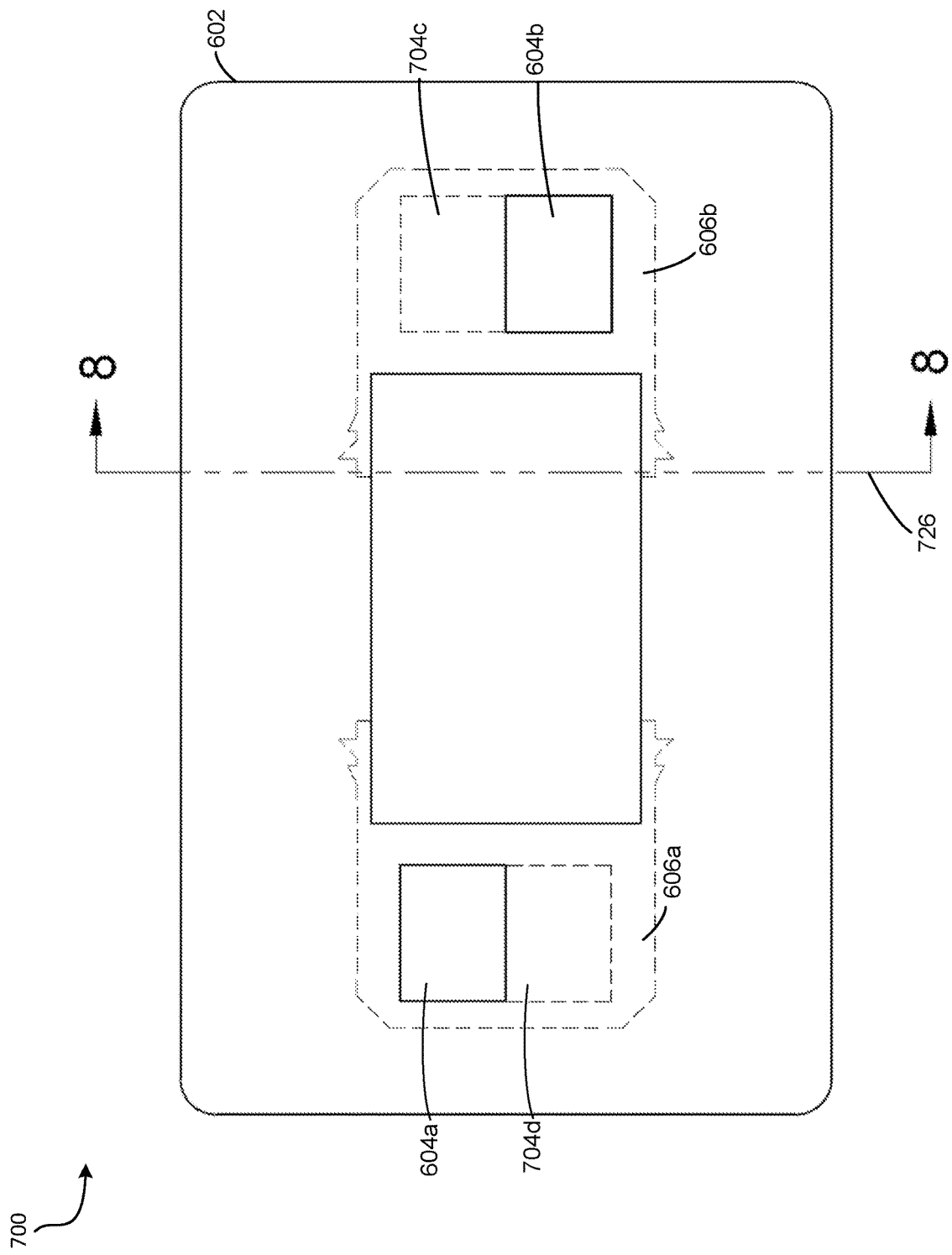
FIG. 7 is a block diagram depicting an example transparent view of smart chip card system 602 showing two EMV chips on the front and two EMV chips on the back, in accordance with some embodiments of the present disclosure.

FIG. 7 is a block diagram depicting an example transparent view of smart chip card system 602 showing two EMV chips on the front and two EMV chips on the back, in accordance with some embodiments of the present disclosure. That is, the transparent view 700 shows a transparent view of the same cards in FIG. 6 showing how the interior pocket can look inside the card body and also showing how the back side mirrors the front with two more windows for the micro EMV chips that are inserted facing opposite to the chips on the front.

The smart chip card system 602 includes a smart chip card system 604a (e.g., a cavity, a space, a void) that is configured to hold an EMV smart chip (e.g., a third EMV chip) that is associated with an account of a user of the smart chip card system 602. The smart chip card system 602 includes a smart chip card system 604b (e.g., a cavity, a space, a void) that is configured to hold an EMV smart chip (e.g., a third EMV chip) that is associated with an account of a user of the smart chip card system 602.

The smart chip card system 602 includes a smart chip window 704d that is configured to expose the contact surfaces of a micro EMV chip to allow an EMV card reader to read (e.g., access) the micro EMV chip. The smart chip card system 602 includes a smart chip window 704c that is configured to expose the contact surfaces of a micro EMV chip to allow an EMV card reader to read the micro EMV chip.

Figure 8:
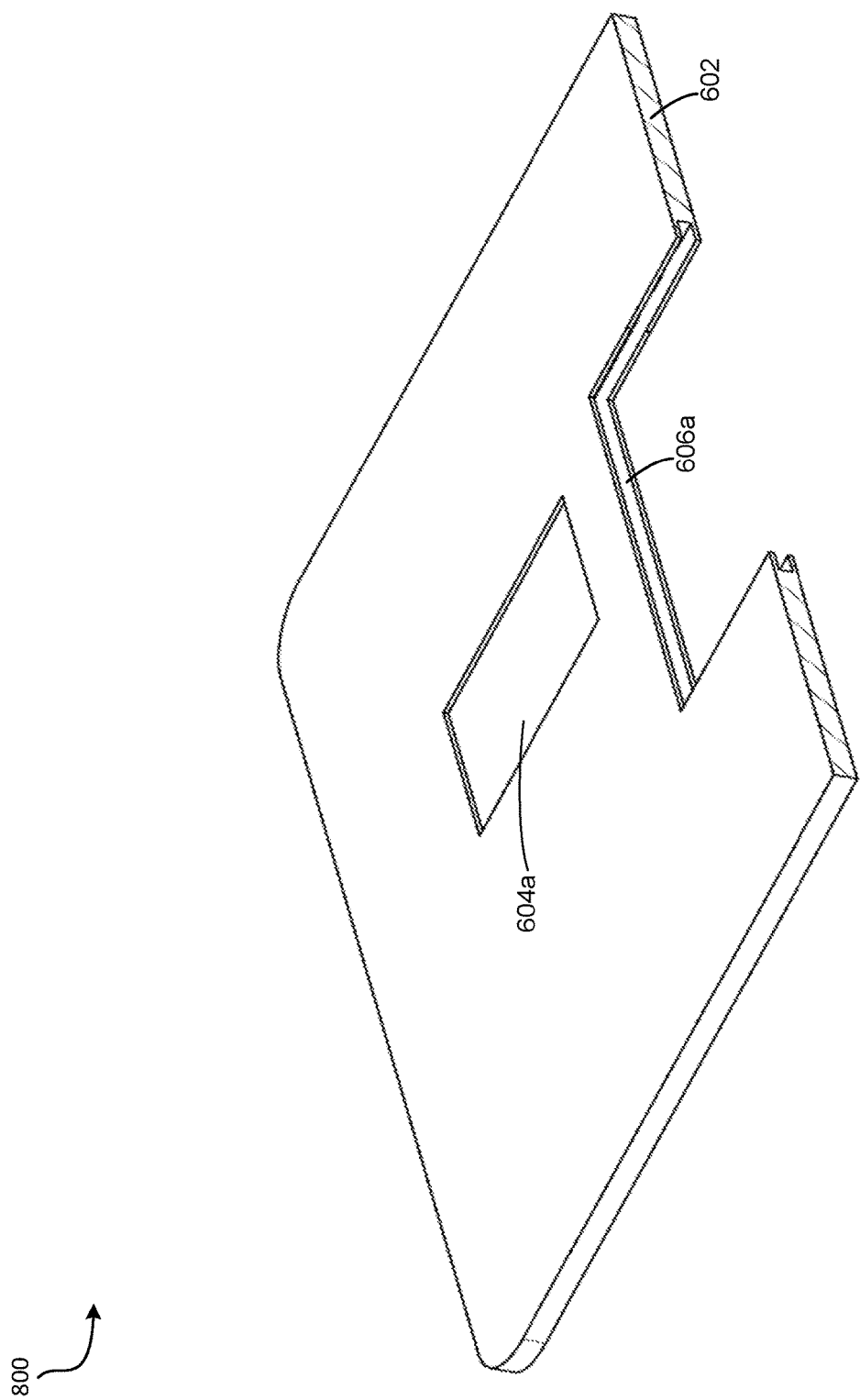
FIG. 8 is a block diagram depicting the cross-cut view the smart chip card system 602 corresponding to the sectional line 726, in accordance with some embodiments of the present disclosure.

The sectional line 726 corresponds to the location of the cross-cut view of FIG. 8.

FIG. 8 is a block diagram depicting the cross-cut view the smart chip card system 602 corresponding to the sectional line 726, in accordance with some embodiments of the present disclosure. In some embodiments, the smart chip card system 602 may have a thickness of 0.84 mm+/−20%.

Figure 9:
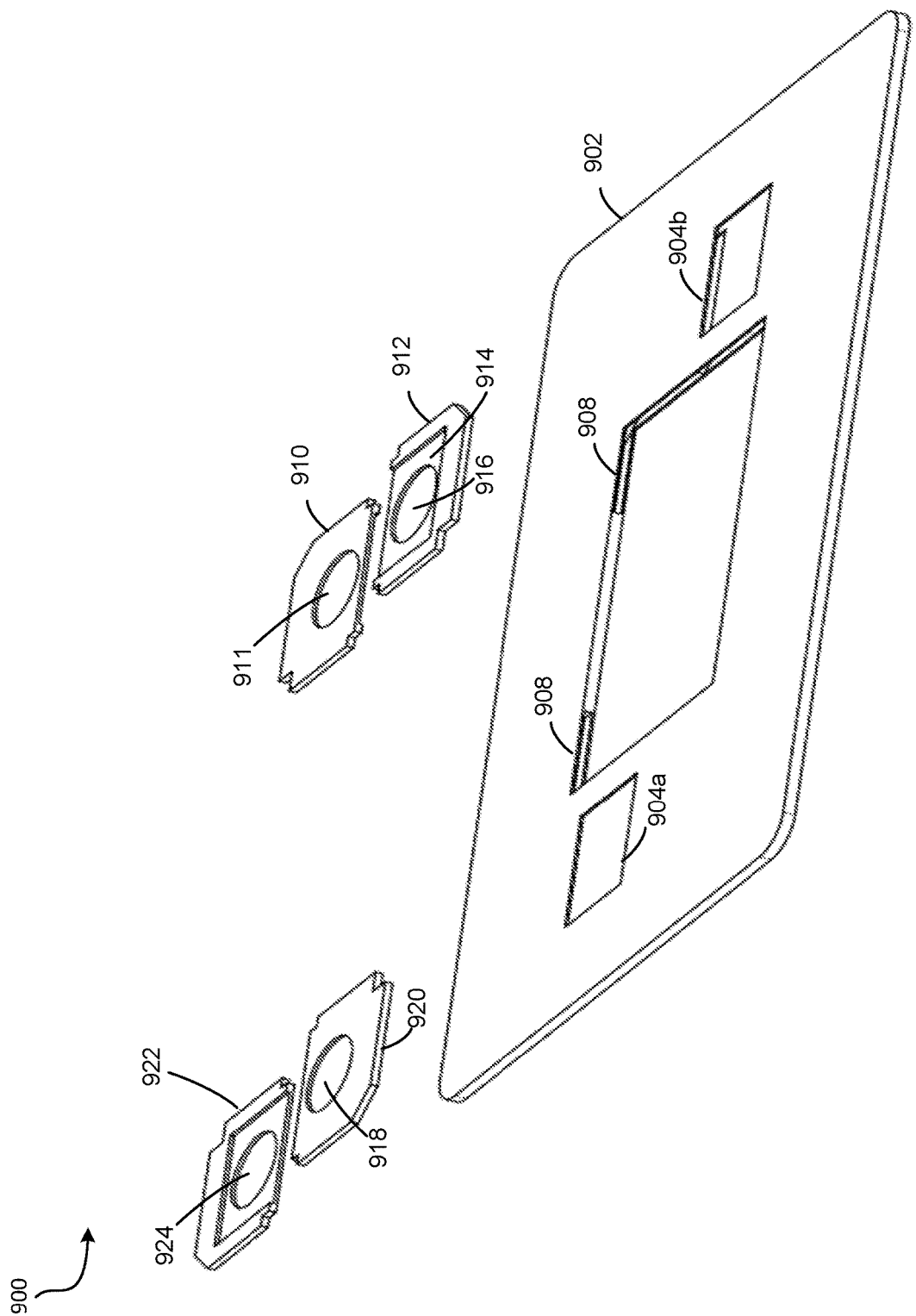
FIG. 9 is a block diagram depicting an example modular version of a smart chip card system configured to hold a plurality of EMV chips without using retaining clips, in accordance with some embodiments of the present disclosure.

FIG. 9 is a block diagram depicting an example modular version of a smart chip card system configured to hold a plurality of EMV chips without using retaining clips, in accordance with some embodiments of the present disclosure. The smart chip card system 902 includes a smart chip window 904a that is configured to expose the contact surfaces of a micro EMV chip to allow an EMV card reader to read (e.g., access) the micro EMV chip. The smart chip card system 902 includes a smart chip window 904b that is configured to expose the contact surfaces of a micro EMV chip to allow an EMV card reader to read the micro EMV chip.

The smart chip card system 902 includes a micro EMV chip body 922 (shown in FIG. 9 as facing right-side up) configured to hold an EMV chip in its center cavities. The micro EMV chip body 922 includes a smart chip card system 902 configured to place/insert an EMV chip into a cutout 924. The cutout 924 is configured to provide an additional depth in the micro EMV chip body 922 to accommodate connections and a smart chip (e.g., microchip of EMV chip).

The smart chip card system 902 includes a micro EMV chip body 920 (shown in FIG. 9 as facing upside-down when inserted into the smart chip card system 902) configured to hold an EMV chip in its center cavities. The micro EMV chip body 920 includes a cutout 918. The cutout 918 is configured to provide an additional depth in the micro EMV chip body 920 to accommodate connections and a smart chip (e.g., microchip of EMV chip).

The smart chip card system 902 includes a micro EMV chip body 912 (shown in FIG. 9 as facing right-side up) configured to hold an EMV chip in its center cavities. The micro EMV chip body 912 includes a smart chip card system 914 configured to place/insert an EMV chip into a cutout 916. The cutout 916 is configured to provide an additional depth in the micro EMV chip body 912 to accommodate connections and a smart chip (e.g., microchip of EMV chip).

The smart chip card system 902 includes a micro EMV chip body 910 (shown in FIG. 9 as facing upside-down when inserted into the smart chip card system 902) configured to hold an EMV chip in its center cavities. The micro EMV chip body 910 includes a cutout 911. The cutout 911 is configured to provide an additional depth in the micro EMV chip body 910 to accommodate connections and a smart chip (e.g., microchip of EMV chip).

The smart chip card system 902 includes a pocket 908 that is configured as an opening for 2 micro EMV chips to be inserted (one for each side of the card).

Figure 10:
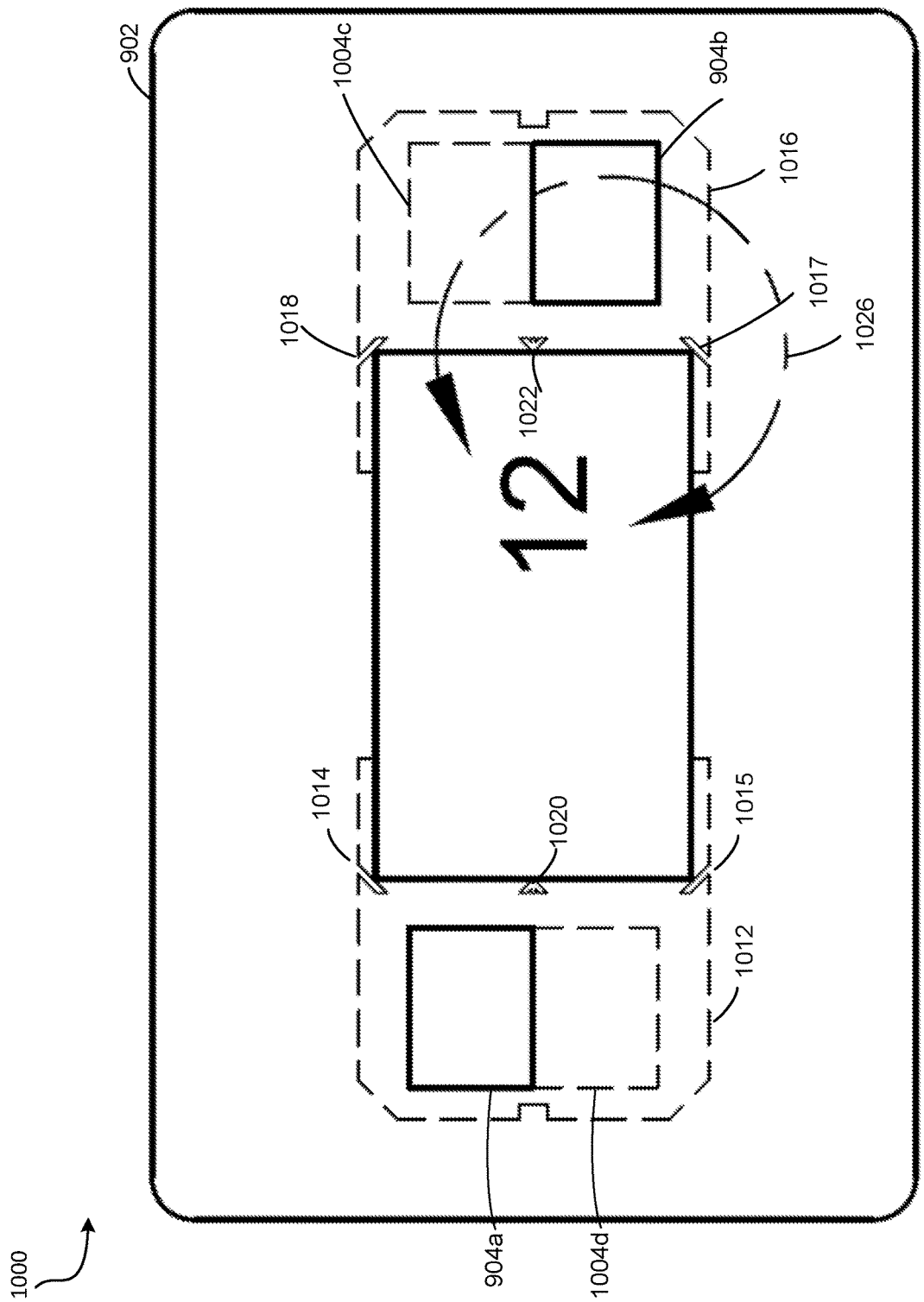
FIG. 10 is a block diagram depicting an example transparent view of smart chip card system 902 showing two EMV chips on the front and two EMV chips on the back, in accordance with some embodiments of the present disclosure.

FIG. 10 is a block diagram depicting an example transparent view of smart chip card system 902 showing two EMV chips on the front and two EMV chips on the back, in accordance with some embodiments of the present disclosure. That is, the transparent view 1000 shows a transparent view of the same card in FIG. 9 showing how the interior pocket looks inside the card body and also showing how the back side mirrors the front with two more windows for the micro EMV chips that are inserted facing opposite to the chips on the front. Also showing how built in latches helps to keep mini EMV chip secure inside card body pocket.

The smart chip card system 902 includes an EMV window 1004c to permit a micro EMV chip inside the card body to have its contact surface expose so that it can be read by any EMV card reader. The smart chip card system 902 includes an EMV window 1004d to permit a micro EMV chip inside the card body to have its contact surface expose so that it can be read by any EMV card reader.

The smart chip card system 902 includes a built-in latch lock 1014 configured to keep (e.g., maintain, position) a mini EMV chip secure inside card body pocket. The smart chip card system includes a built-in latch lock 1015 configured to keep a mini EMV chip secure inside card body pocket. The smart chip card system 902 includes a built-in latch lock 1017 configured to keep mini EMV chip secure inside card body pocket. The smart chip card system 902 includes a built-in latch lock 1018 configured to keep mini EMV chip secure inside card body pocket. The smart chip card system 902 includes a built-in latch lock 1020 configured to keep mini EMV chip secure inside card body pocket. The smart chip card system 902 includes a built-in latch lock 1022 configured to keep mini EMV chip secure inside card body pocket.

The smart chip card system 902 includes a pocket 1012 that is a slot opening sandwiched in the center or near (i.e., offset from) the center of the card body that allows 2 micro EMV chips to be inserted (one for each side of the card). The smart chip card system 902 includes a pocket 1016 that is a slot opening sandwiched in the center or near (i.e., offset from) the center of the card body that allows 2 micro EMV chips to be inserted (one for each side of the card).

Figure 11:
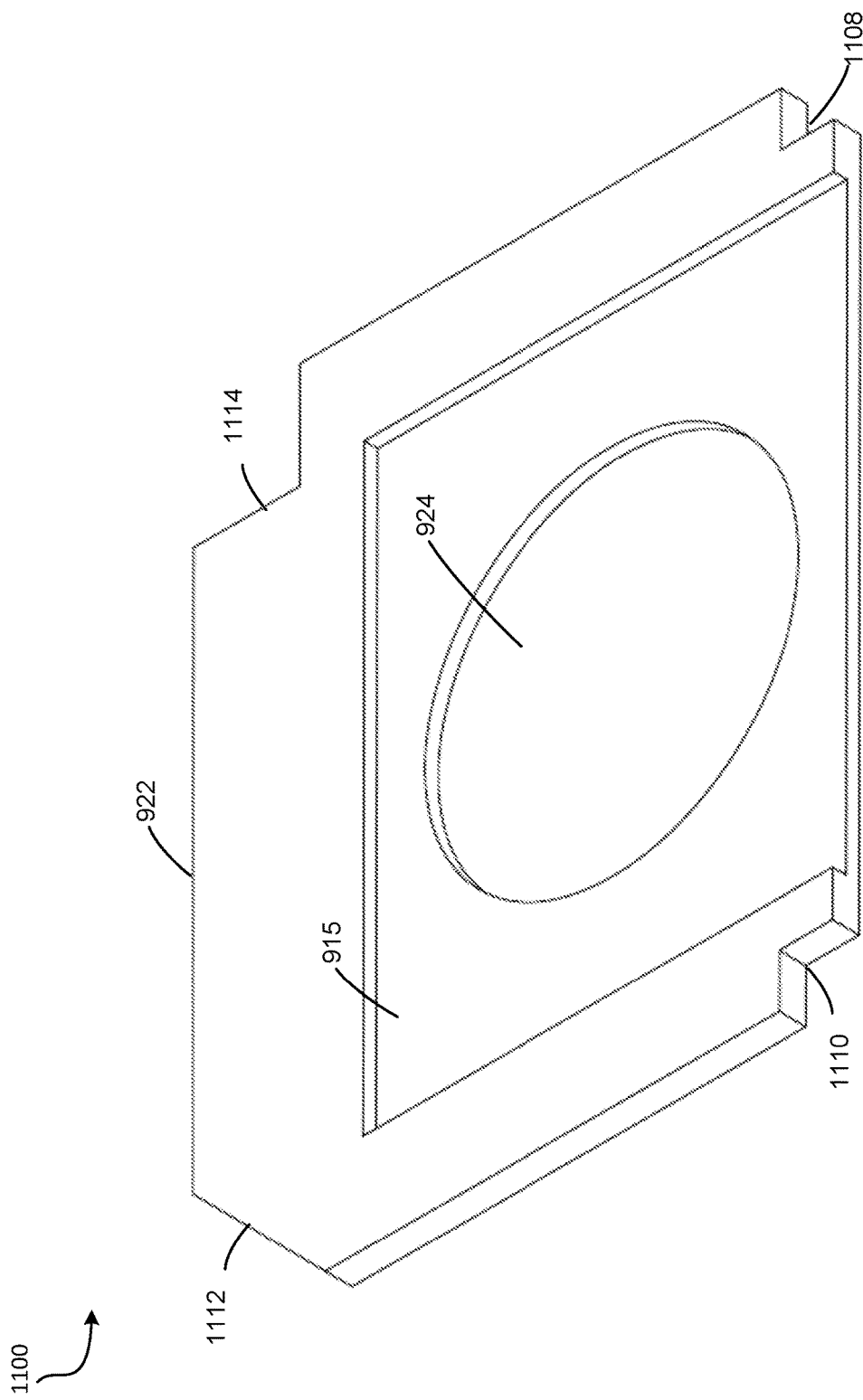
FIG. 11 is a block diagram depicting the micro EMV chip body 922 in FIG. 10, in accordance with some embodiments of the present disclosure.

FIG. 11 is a block diagram depicting the micro EMV chip body 922 in FIG. 10, in accordance with some embodiments of the present disclosure. The EMV chip body 922 includes a smart chip holder 915 (sometimes referred to as, "a smart chip location") that is configured to hold an EMV chip in its center cavities. The EMV chip body 922 includes a cutout 924 configured to provide an additional depth in the cavity to accommodate connections and microchip of EMV chip.

The EMV chip body 922 includes a chip notch 1108 configured to secure the EMV chip body 922 in the card body pocket (e.g., pockets 908, 1016, 1012) of the smart chip card system 902 and/or align the EMV chip in an EMV window (e.g., EMV windows 1004c, 1004d) of the smart chip card system 902. The EMV chip body 922 includes a chip notch 1110 for helping secure the chip in the card body pocket and also to help align chip in the EMV window. The EMV chip body 922 includes an angled edge 1112 configured to prevent (e.g., prohibit, mitigate) inserting an EMV chip into the EMV chip body 922 in the wrong position (e.g., upside down, incorrectly rotated). The EMV chip body 922 includes a chip notch 1114 configured to secure the chip in the card body pocket and/or align chip in the EMV window.

Figure 12:
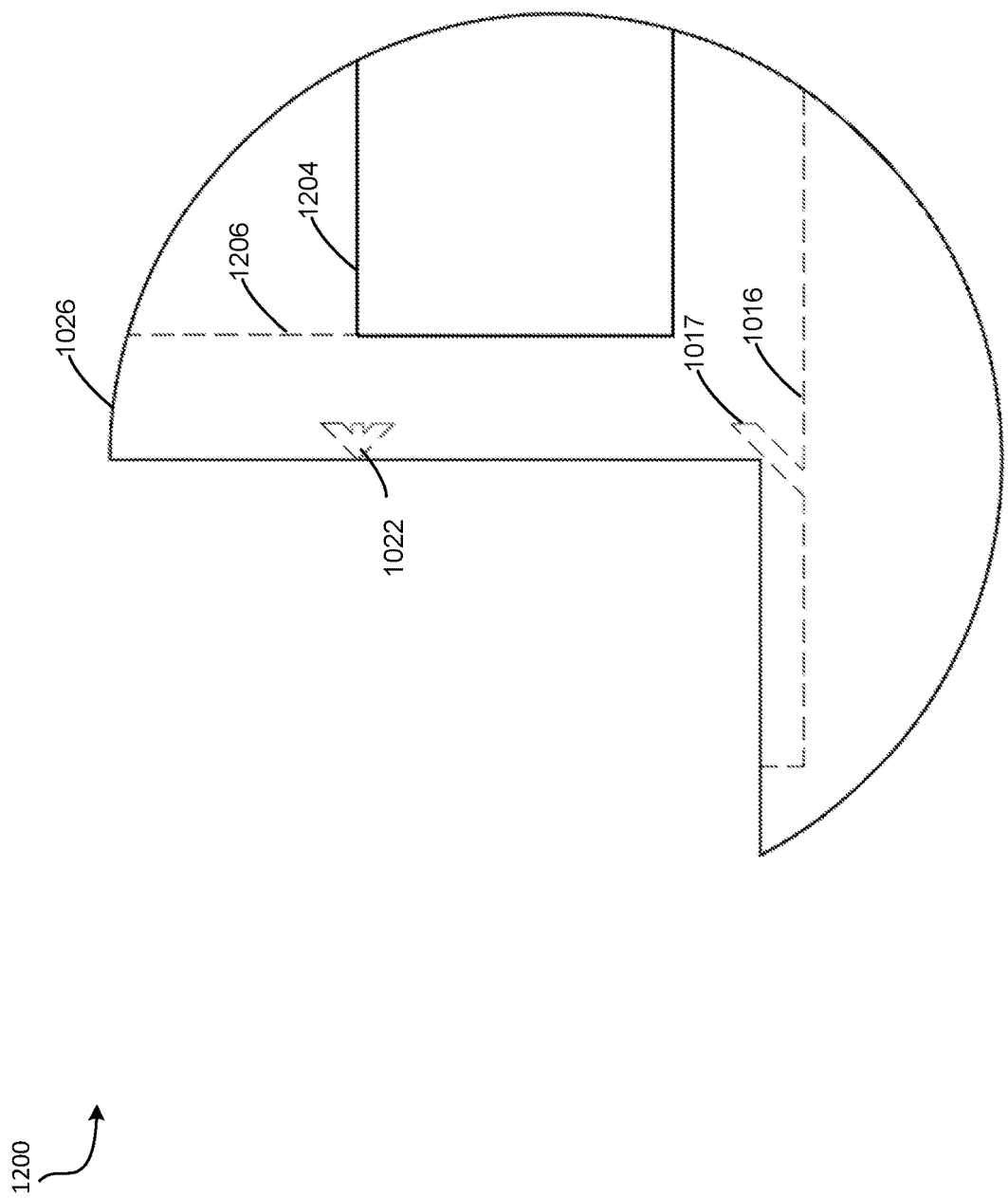
FIG. 12 is a block diagram depicting an enlarged view of the micro EMV chip body 922 in FIG. 10, in accordance with some embodiments of the present disclosure.

FIG. 12 is a block diagram depicting an enlarged view of the micro EMV chip body 922 in FIG. 10, in accordance with some embodiments of the present disclosure. The micro EMV chip body 922 includes feature 1022, feature 1017, feature 1016, feature 1206, and feature 1204.

Figure 13:
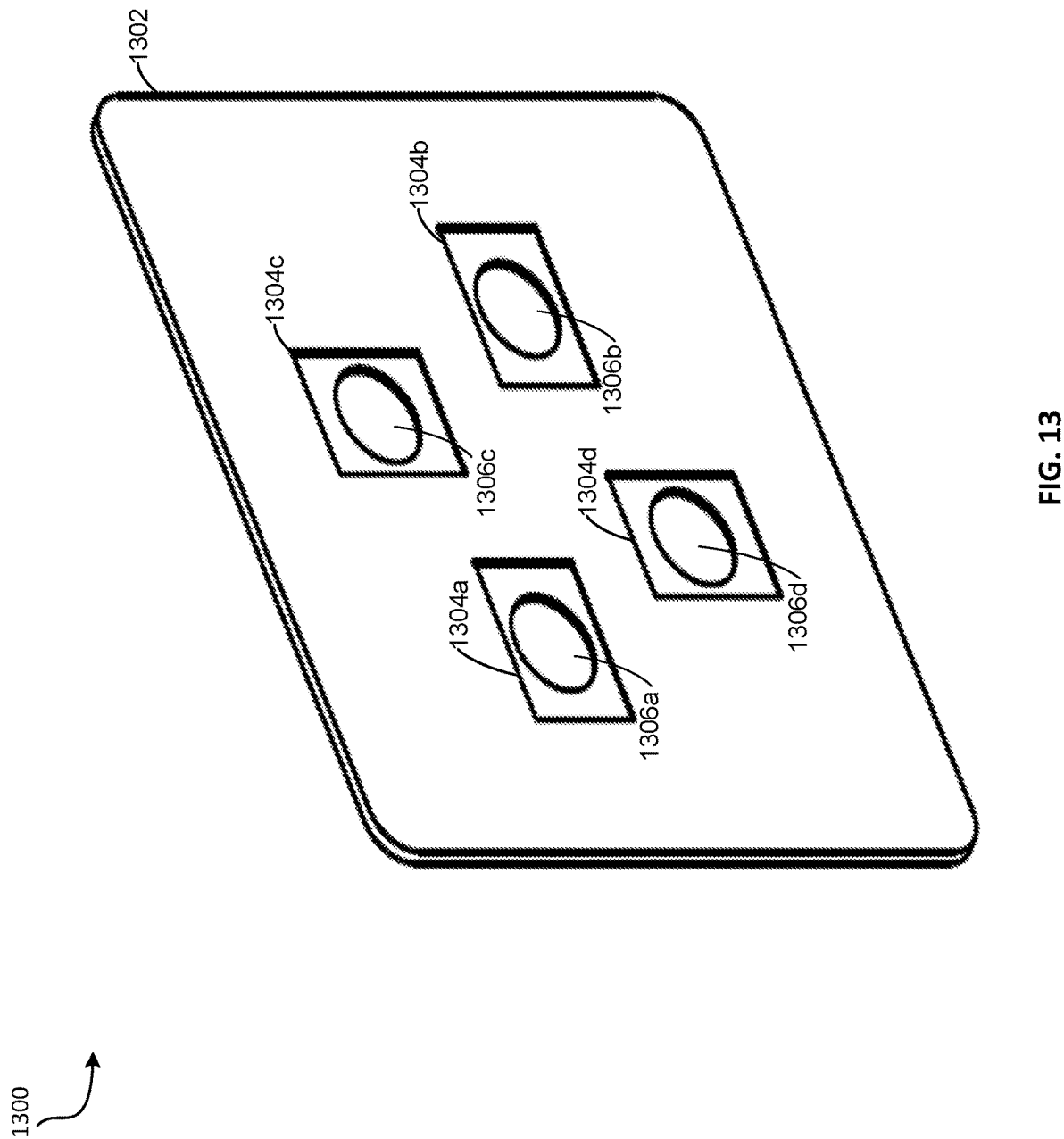
FIG. 13 is a block diagram depicting an example smart chip card system configured to hold a plurality of EMV chips, in accordance with some embodiments of the present disclosure.

FIG. 13 is a block diagram depicting an example smart chip card system configured to hold a plurality of EMV chips, in accordance with some embodiments of the present disclosure. As shown, the smart chip card system 1302 is a card with mounting spots (e.g., locations) for 4 EMV chips on the front (and 4 on the back not shown). In some embodiments, the smart chip card system 1302 may include or omit (for the purpose of reducing the size of the card and/or making room for a maximum number of EMV chips) one or more magnetic stripes.

The smart chip card system 1302 includes a smart chip holder 1304a (e.g., a cavity, a space, a void) that is configured to hold an EMV smart chip (not shown in FIG. 1) that is associated with a first account of a user of the smart chip card system 1302. The smart chip card system 102 includes a smart chip holder 1304b that is configured to hold an EMV smart chip (not shown in FIG. 1) that is associated with a second account of the user. The smart chip card system 1302 includes a smart chip holder 1304c (e.g., a cavity, a space, a void) that is configured to hold an EMV smart chip (not shown in FIG. 1) that is associated with a first account of a user of the smart chip card system 1302. The smart chip card system 102 includes a smart chip holder 1304d that is configured to hold an EMV smart chip (not shown in FIG. 1) that is associated with a second account of the user. In some embodiments, any of the accounts (e.g., the first account, the second account, the third account, the fourth account) may correspond to different accounts of the user.

The smart chip holder 1304a includes a cutout 1306a providing an additional depth in the smart chip holder 1304a to accommodate connections and a smart chip (e.g., microchip of EMV chip). The smart chip holder 1304b includes a cutout 1306b providing an additional depth in the smart chip holder 1304b to accommodate connections and a smart chip (e.g., microchip of EMV chip). The smart chip holder 1304c includes a cutout 1306c providing an additional depth in the smart chip holder 1304c to accommodate connections and a smart chip (e.g., microchip of EMV chip). The smart chip holder 1304d includes a cutout 1306d providing an additional depth in the smart chip holder 1304d to accommodate connections and a smart chip (e.g., microchip of EMV chip). In some embodiments, the cutouts (e.g., cutout 1306a, cutout 1306b, cutout 1306c, cutout 1306d) may be any size and shape (e.g., circle, oval, rectangle, triangle, etc.).

Figure 14:
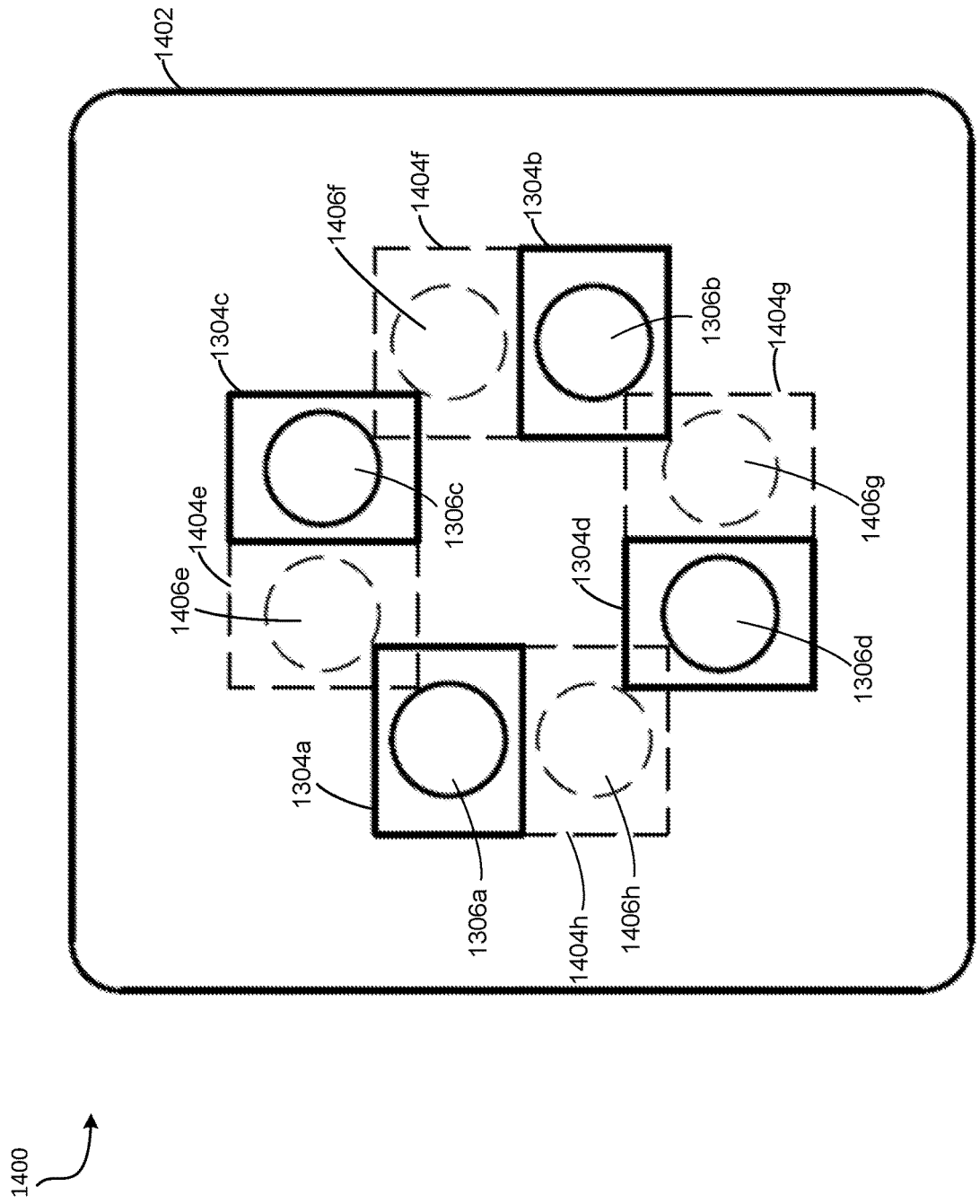
FIG. 14 is a block diagram depicting an example transparent view of smart chip card system 1402 showing four EMV chips on the front and two EMV chips on the back, in accordance with some embodiments of the present disclosure.

FIG. 14 is a block diagram depicting an example transparent view of smart chip card system 1402 showing four EMV chips on the front and two EMV chips on the back, in accordance with some embodiments of the present disclosure. The smart chip card system 102 includes a smart chip holder 1404h (e.g., a cavity, a space, a void) that is configured to hold an EMV smart chip that is associated with an account of a user of the smart chip card system 1402. The transparent view 1400 shows the back of the EMV smart chip in the smart chip holder 1404h. The smart chip holder 1404h includes a cutout 1406h providing an additional depth in the smart chip holder 1404h to accommodate connections and a smart chip (e.g., microchip of EMV chip).

The smart chip card system 102 includes a smart chip holder 1404g (e.g., a cavity, a space, a void) that is configured to hold an EMV smart chip that is associated with an account of a user of the smart chip card system 1402. The transparent view 1400 shows the back of the EMV smart chip in the smart chip holder 1404g. The smart chip holder 1404g includes a cutout 1406g providing an additional depth in the smart chip holder 1404g to accommodate connections and a smart chip (e.g., microchip of EMV chip).

The smart chip card system 102 includes a smart chip holder 1404f (e.g., a cavity, a space, a void) that is configured to hold an EMV smart chip that is associated with an account of a user of the smart chip card system 1402. The transparent view 1400 shows the back of the EMV smart chip in the smart chip holder 1404f. The smart chip holder 1404f includes a cutout 1406f providing an additional depth in the smart chip holder 1404f to accommodate connections and a smart chip (e.g., microchip of EMV chip).

The smart chip card system 102 includes a smart chip holder 1404e (e.g., a cavity, a space, a void) that is configured to hold an EMV smart chip that is associated with an account of a user of the smart chip card system 1402. The transparent view 1400 shows the back of the EMV smart chip in the smart chip holder 1404e. The smart chip holder 1404e includes a cutout 1406e providing an additional depth in the smart chip holder 1404e to accommodate connections and a smart chip (e.g., microchip of EMV chip).

Figure 15:
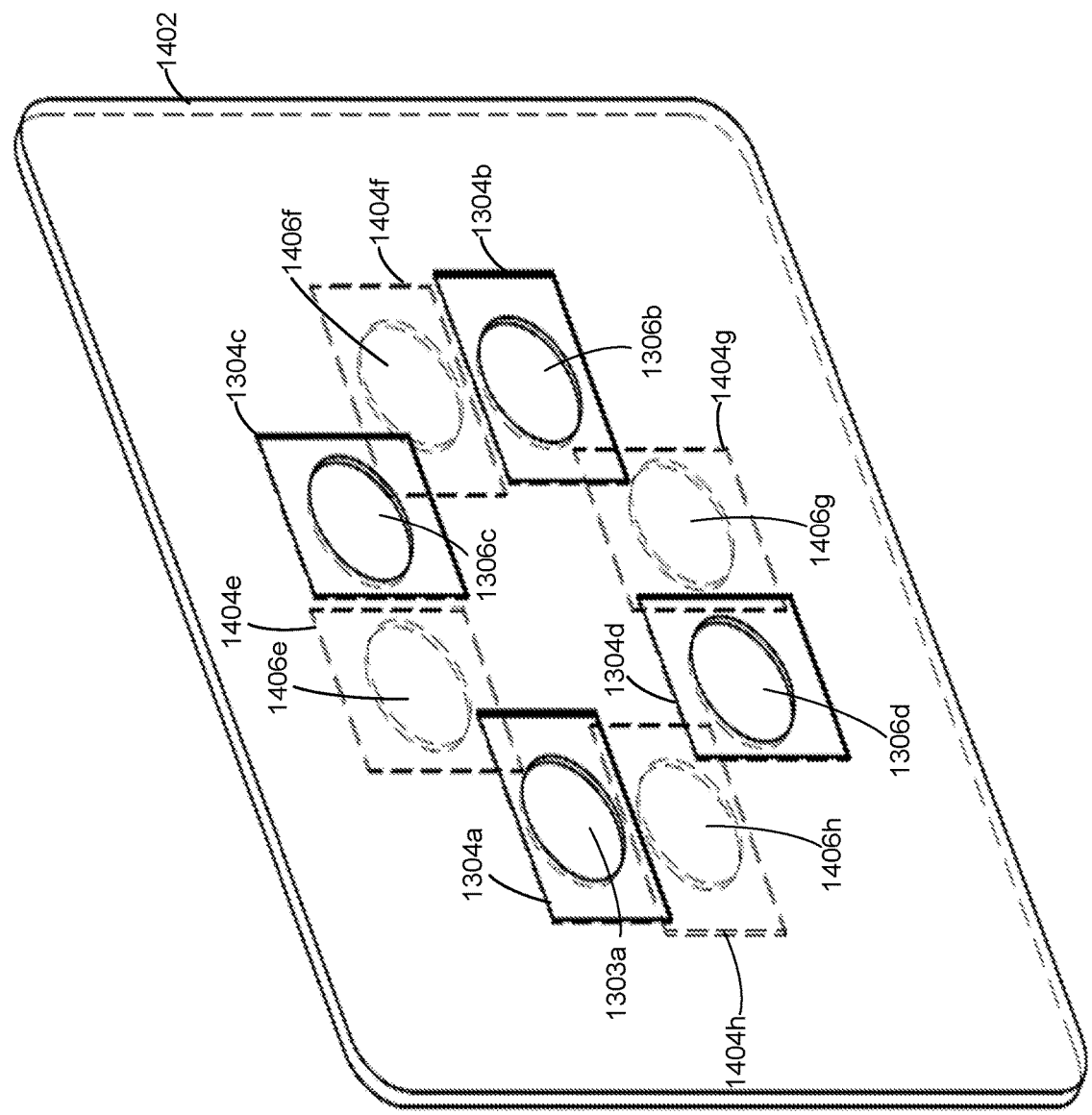
FIG. 15 is a block diagram depicting an example transparent view of smart chip card system 1402 showing four EMV chips on the front and two EMV chips on the back, in accordance with some embodiments of the present disclosure.

FIG. 15 is a block diagram depicting an example transparent view of smart chip card system 1402 showing four EMV chips on the front and two EMV chips on the back, in accordance with some embodiments of the present disclosure.

Figure 16:
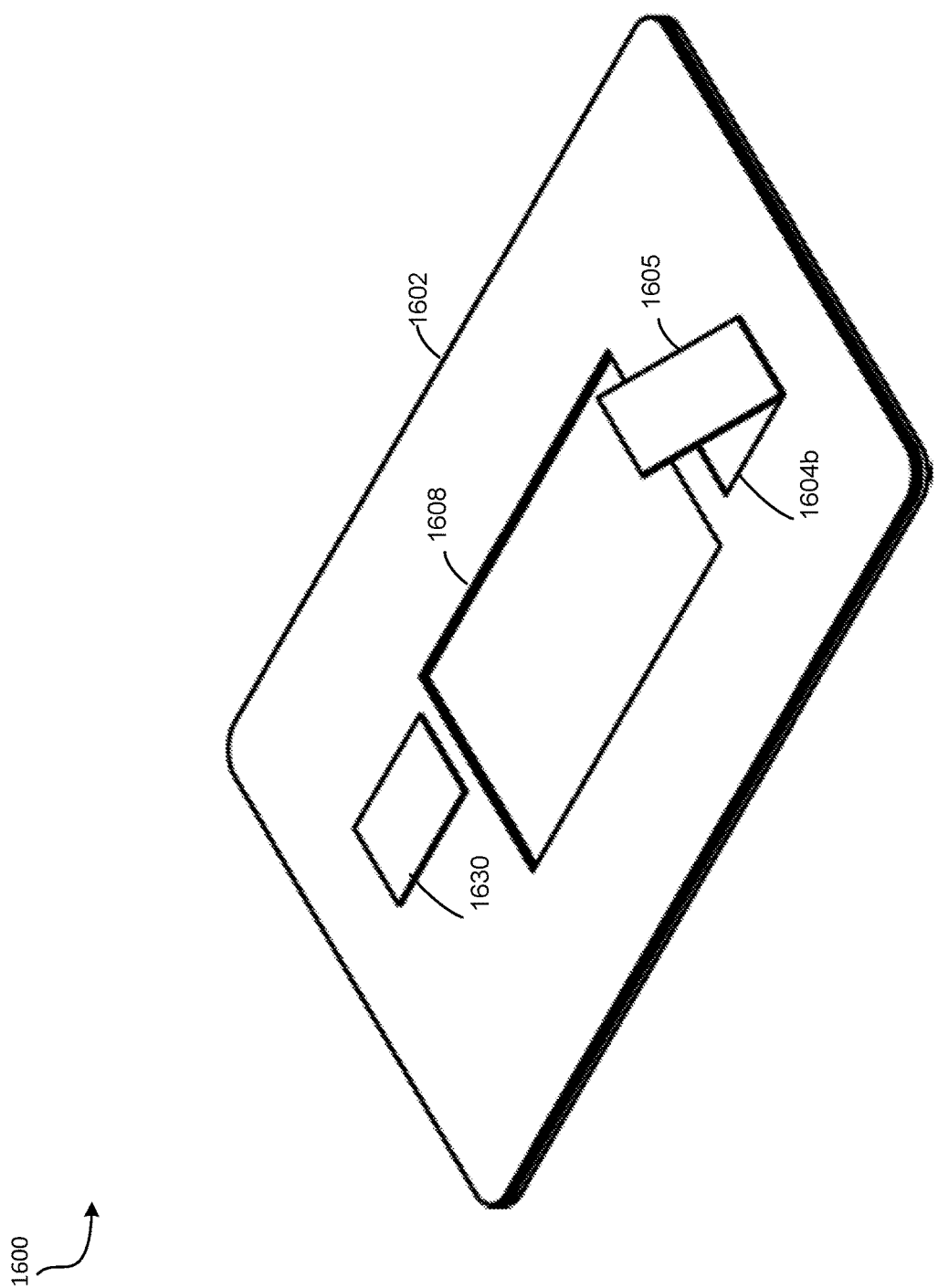
FIG. 16 is a block diagram depicting an example smart chip card system configured to hold a plurality of EMV chips that are electrically isolated from one another using one or more RFID blockers, in accordance with some embodiments of the present disclosure.

FIG. 16 is a block diagram depicting an example smart chip card system configured to hold a plurality of EMV chips that are electrically isolated from one another using one or more RFID blockers, in accordance with some embodiments of the present disclosure. The smart chip card system 1602 includes pockets for inserting one or more micro EMV chips inside the smart chip card system 1602. In some embodiments, the pockets are configured to allow the EMV chips to be easily removed once expired/exhausted or for personal customization freedom by the user. In some embodiments, the pockets allow the smart chip card system 1602 to support a plurality (e.g., four) different EMV accounts with different expiration times. In some embodiments, the pockets reduce the use of raw material by up to 97% in the manufacturing of the micro form EMV chips.

The smart chip card system 1602 includes one or more EMV windows 1604 (e.g., 2, 4, 6, 8) configured to permit a micro EMV chip inside the card body to have its contact surface exposed so that it can be read by an EMV card reader. The smart chip card system 1602 includes one or more built-in RFID blocker doors 1605 for each of the EMV windows 1604 for the purpose of allowing each of the micro EMV chips to be RFID enabled (NFC is actually more specific type of RFID typically used in contactless payment) without interfering with each other during the moment of purchase (transaction).

The smart chip card system 1602 includes a pocket 1608 that is a slot opening sandwiched in the center of the body of the smart chip card system 1602 that allows a plurality (e.g., 2, 4, 6, 8) micro EMV chips to be inserted (one for each side of the card).

The smart chip card system 1602 includes an RFID blocker door 1630 built into the smart chip card system 1602 for each of the EMV windows. In some embodiments, the RFID blocker door 1630 is configured to protect each of the micro EMV chips from being read through a wallet and/or purse by identity and/or credit card thieves. In some embodiments, the RFID blocker door 1630 is configured to allow a user, at the point/time of purchase, to unblock the EMV that is associated with a particular account and/or use its RFID to make a contactless payment while the other EMVs remain unreadable.

Figure 17:
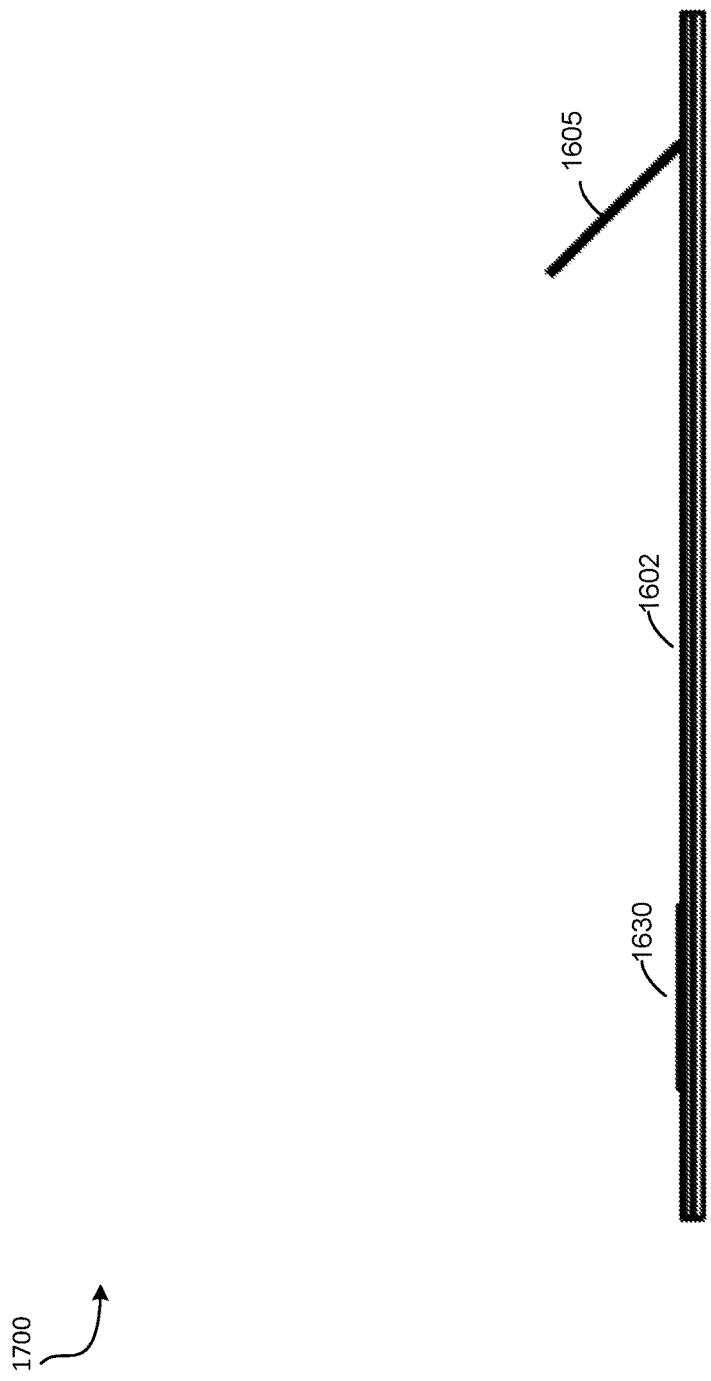
FIG. 17 is a block diagram depicting an example view of the smart chip card system 1602, in accordance with some embodiments of the present disclosure.

FIG. 17 is a block diagram depicting an example view of the smart chip card system 1602, in accordance with some embodiments of the present disclosure.

Figure 18:
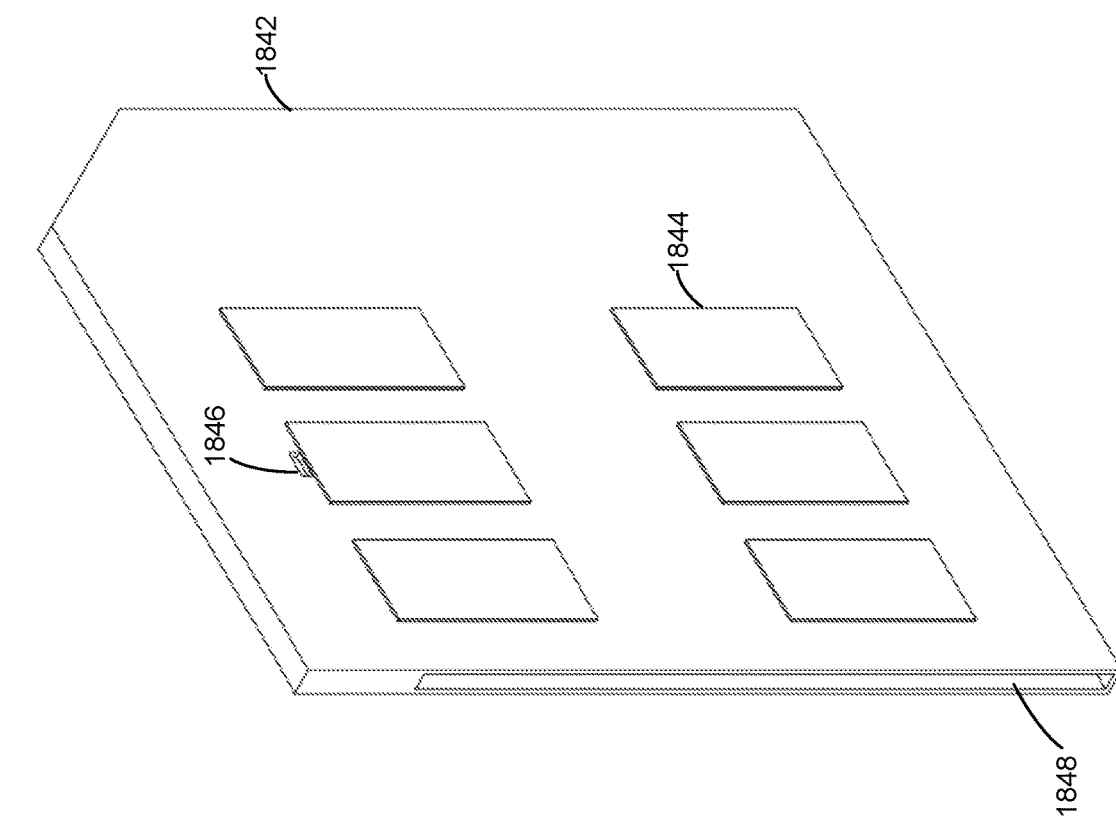
FIG. 18 is a block diagram depicting an example small form bank card with a micro EMV chip capable of NFC, in accordance with some embodiments of the present disclosure.

FIG. 18 is a block diagram depicting an example small form bank card with a micro EMV chip capable of NFC, in accordance with some embodiments of the present disclosure. In some embodiments, the micro EMV chip 1842 incorporates the full features of a standard bank card into a small form factor. In some embodiments, the micro EMV chip 1842 includes one or more EMV metal contacts for the transfer (e.g., exchange, communication) of information. In some embodiments, the micro EMV chip 1842 includes EMV metal contacts 1844 that are configured to connect (e.g., couple) to a terminal at the time of sale to transfer data in and/out of the EMVs microchip. In some embodiments, a user may cause and/or create a connection between the EMV microchip and the NFC antenna (on the micro form chip) by squeezing the microchip to allow (e.g., permit, cause, trigger) the microchip information to pass (e.g., transmit) to the terminal reader via the antenna without requiring the terminal to contact (e.g., touch) the microchip—i.e., contactless transmission. In some embodiments, the micro EMV chip 1842 includes an EMV indicator 1846 (e.g., an LED light) that is configured to inform the user when the micro EMV that has been selected/activated has power from a terminal and should be transferring data. In some embodiments, the EMV indicator 1846 may be configured to give the user a visual indication that the card the user has selected is active and transmitting. In some embodiments, the micro EMV chip 1842 includes a micro EMV card button pocket 1848. In some embodiments, the micro EMV chip 1842 is equipped with a button and/or switch that is in the normally off position. In this instance, the pocket 1848 shows a space for accommodating the button and/or switch. In some embodiments, the button and/or switch may be configured to grant the NFC permission to communicate only when activated (e.g., via squeezing, via moving, via toggling, etc.) by the user.

Figure 19:
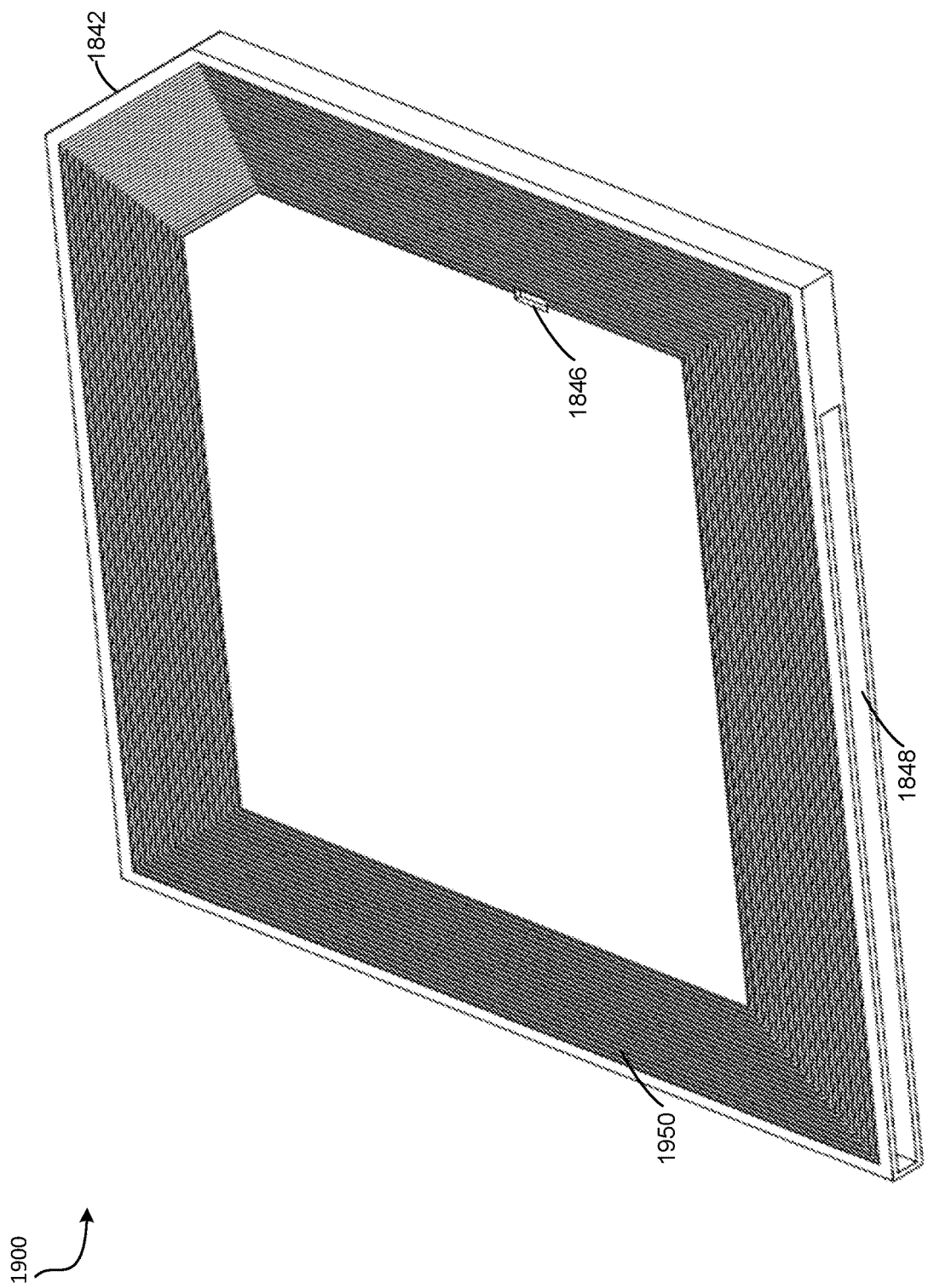
FIG. 19 is a block diagram depicting an example a backside of the small form bank card 1842 with a micro EMV chip capable of NFC, in accordance with some embodiments of the present disclosure.

FIG. 19 is a block diagram depicting an example a backside of the small form bank card 1842 with a micro EMV chip capable of NFC, in accordance with some embodiments of the present disclosure. In some embodiments, the small form bank card 1842 includes a button and/or switch that is configured to grant the NFC permission to communicate only when activated (e.g., via squeezing, via moving, via toggling, etc.) by the user. In some embodiments, the small form bank card 1842 includes an NFC enabled chip that is configured to communicate information over the air without the need to make physical contact between the NFC enabled chip and an NFC reader.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may include a magnetic strip. There are 3 ways to use a card to pay at the time of purchase, one of these methods (systems) is to "swipe your card," though less common and/or less secure than other methods, it is still used at the pump at gas stations and vending machines as the primary way to pay. It also offers the redundancy (a backup) of having a second system to use your bank card in the case that the chip reader fails or is unavailable.

A smart chip card system may include a plurality (e.g., 2, 4, 6, 8) of EMV chips and a plurality of magnetic stripes, where each EMV chip can be associated with a respective magnetic stripe. With 2 magnetic stripes on the front and 2 more on the back.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may include an EMV chip. In some embodiments, a user may make a purchase with a bank card by inserting it with the smart chip card system. In some embodiments, a microchip may be Europay, Mastercard, Visa (EMV). In some embodiments, only one EMV chip is assigned per bank card, but with this smart chip card system that can fit four-to-one.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may support contactless payments. In some embodiments, contactless payment uses a form of Radio Frequency Identification (RFID), such as Near Field Communication (NFC), to make a transaction through the air wirelessly. In some embodiments, the smart chip card system may include an NFC button and/or an RFID blocker door that are each configured to allow the smart chip card system and/or the user to select and/or enable an NFC smart card among a plurality of NFC cards on the smart chip system for communicating read/write instructions with a transaction terminal (e.g., NFC card reader). Since the NFC button and/or the RFID block only enables a single NFC card, none of the other NFC cards on the smart card system may communicate read/write instructions with the transaction terminal, thereby preventing and/or mitigating RF signal interference among the NFC cards. Furthermore, since the NFC cards are disabled from wireless communication in their normal state, it would also have the benefit of protecting against wireless fraud and theft of the user account information that is stored on the NFC enabled smart card, which is one of the major disadvantages of conventional systems using NFC technology for performing transactions (e.g., payment, sharing user account info with a smart card reader, etc.).

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may be safe from Radio Frequency Identification (RFID) attacks. RFID is a way to communicate over the air with wave signals. These signals can be tuned in and copied with the correct equipment (e.g., a transaction terminal, a sniffer). Bank Cards use a type of RFID called NFC (Near Field Communication) that can also be read this way and while it is intended to only be read by a register or terminal at the time of purchase, it can also be accessed by a third party (e.g., hackers, frauders, thieves) with the right equipment. The smart chip card system disclosed herein can solve this problem with two solutions: First, the smart chip card system may include an RFID blocker built into the card that can only be opened to allow payment only when needed, making it impervious any other time. Second, the smart chip card system may include an EMV chip that can only be activated at the time of check out by the selection of a built in switch, it then becomes inactive seconds later. The RFID block and/or the selectable EMV chip may grant (e.g., allow, permit, enable) a time window (microseconds, milliseconds, or seconds) for the EMV to be active and prone to attack, thereby preventing and/or mitigating the ability for a third party to wirelessly steal a user's financial information from the smart cards in the user's wallet.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may have an extended expiration date or no expiration date. The conventional bank card expires after 2-3 years at which time the user must throw it away—this is both inconvenient for the user and environmentally unfriendly. Conversely, the smart card system of the present disclosure provides a solution to this problem. That is, in order to deal with different expiration dates of multiple EMV chips on one card, in some embodiments, the smart card system is modular. By making the standard size card in a miniaturized chip, the chip can be used in card embodiments such as a 4-in-1 card. When it comes time to replace a miniaturized chip (e.g., micro EMV chip), a new one can be slid in its place, thereby resulting in minimal waste and the card body can continue to be used indefinitely.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) and/or a micro EMV chip (e.g., micro EMV chip 1842 in FIG. 18) may be globally accepted. In the past, a magnetic stripe has been the only way to pay with a card and even still in some places that haven't been updated to accept EMV chips, it is the only way to pay. Today, the most common way to pay is by inserting the chip (EMV), and most places around the world have this ability. Looking to the future we have tap and pay (e.g., contactless NFC), the newest of the technologies that will eventually become the most popular way to pay. This card can do all three of them and makes it a perfect choice no matter where your travels take you, old or new, you will always have a way to pay.

In some embodiments, a smart chip card system (e.g., smart chip card system 402 in FIG. 4, smart chip card system 602 in FIG. 6, smart chip card system 902 in FIG. 9, smart chip card system 1302 in FIG. 13, smart chip card system 1402 in FIG. 14, smart chip card system 1602 in FIG. 16) can hold a plurality of accounts (e.g., 2, 4, 6, 8). In some embodiments, the smart chip card system may omit the magnetic stripe. In some embodiments, the smart chip card system may be used without having to use a smart phone. In some embodiments, the smart chip card system may operate without requiring to be plugged in to a power outlet and/or charged. In some embodiments, the smart chip card system may operate at an ATM and/or a gas pump.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include one or more antennas and/or one or more transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A smart card wallet for holding a plurality of smart cards, comprising:
   a front surface plate;
   a back surface plate;
   a communication interface configured to receive instructions from a transaction terminal;
   a switch coupled to the communication interface; and
   an internal core coupled between the front surface plate and the back surface plate, the internal core comprises:
     a first cavity configured to hold a first smart card that stores one or more sets of information associated with a first account of a user; and
     a second cavity configured to hold a second smart card that stores one or more sets of information associated with a second account of the user;
     wherein the switch is configured to provide the instructions to the first smart card by electrically coupling the communication interface to the first smart card while the second card remains disabled; and
     wherein the first cavity is further configured to hold a metal contact plate of the first smart card toward the front surface plate; and wherein the second cavity is further configured to hold a metal contact plate of the second smart card toward the back surface plate.

2. The smart card wallet of claim 1, wherein the instructions cause the first smart card to transmit, via the communication interface, the one or more sets of information associated with the first account of the user to the transaction terminal.

3. The smart card wallet of claim 1, further comprising:
   a cutout through the internal core, the front surface plate, and the back surface plate, the internal core configured to reduce a weight of the smart card wallet.

4. The smart card wallet of claim 3, wherein the first cavity is adjacent to a side of the cutout and the second cavity is adjacent to an opposing side of the cutout.

5. The smart card wallet of claim 1, wherein the first cavity is further configured to hold a third smart card that stores one or more sets of information associated with a third account of a user, wherein the second cavity is further configured to hold a fourth smart card that stores one or more sets of information associated with a fourth account of the user.

6. The smart card wallet of claim 5, further comprising:
   a first chip body configured to hold the first smart card in the first cavity;
   a second chip body configured to hold the second smart card in the second cavity;
   a third chip body configured to hold the third smart card in the first cavity; and
   a fourth chip body configured to hold the fourth smart card in the second cavity.

7. The smart card wallet of claim 6, further comprising:
   a first retaining clip configured to hold the first chip body and the third chip body in the first cavity; and a second retaining clip configured to hold the second chip body and the fourth chip body in the second cavity.

8. The smart card wallet of claim 1, wherein the communication interface is configured to operate without communicating to a mobile phone.

9. The smart card wallet of claim 1, wherein the first smart card does not have an expiration date.

10. A smart card wallet for holding a plurality of smart cards, comprising:
 a front surface plate;
 a back surface plate;
 a communication interface configured to receive instructions from a transaction terminal;
 a switch coupled to the communication interface; and
 an internal core coupled between the front surface plate and the back surface plate, the internal core comprises:
  a first cavity configured to hold a first smart card that stores one or more sets of information associated with a first account of a user; and
  a second cavity configured to hold a second smart card that stores one or more sets of information associated with a second account of the user;
wherein the switch is configured to provide the instructions to the first smart card by electrically coupling the communication interface to the first smart card while the second card remains disabled; wherein the front surface plate or the back surface plate comprises:
 a first magnetic stripe configured to store at least one set of the one or more sets of information associated with the first account of the user; and
 a second magnetic stripe configured to store at least one set of the one or more sets of information associated with the second account of the user.

11. The smart card wallet of claim 10, wherein the first magnetic stripe and the second magnetic stripe are on opposing sides of the front surface plate or the second magnetic stripe.

12. A smart card wallet for holding a plurality of smart cards, comprising:
 a front surface plate;
 a back surface plate;
 a communication interface configured to receive instructions from a transaction terminal;
 a switch coupled to the communication interface;
 an internal core coupled between the front surface plate and the back surface plate, the internal core comprises:
  a first cavity configured to hold a first smart card that stores one or more sets of information associated with a first account of a user; and
  a second cavity configured to hold a second smart card that stores one or more sets of information associated with a second account of the user;
wherein the switch is configured to provide the instructions to the first smart card by electrically coupling the communication interface to the first smart card while the second card remains disabled; and
 a blocker door configured to electrically isolate the second card from receiving the instructions from the transaction terminal.

13. A smart card wallet for holding a plurality of smart cards, comprising:
 a front surface plate;
 a back surface plate;
 a communication interface configured to receive instructions from a transaction terminal;
 a switch coupled to the communication interface;
 an internal core coupled between the front surface plate and the back surface plate, the internal core comprises:
  a first cavity configured to hold a first smart card that stores one or more sets of information associated with a first account of a user; and
  a second cavity configured to hold a second smart card that stores one or more sets of information associated with a second account of the user;
wherein the switch is configured to provide the instructions to the first smart card by electrically coupling the communication interface to the first smart card while the second card remains disabled; and
 a first window configured to allow the transaction terminal to read the one or more sets of information stored on the first smart card by exposing a metal contact plate of the first smart card to the transaction terminal.

14. A smart card wallet for holding a plurality of smart cards, comprising:
 a front surface plate;
 a back surface plate;
 an internal core coupled between the front surface plate and the back surface plate, the internal core comprises:
  a first cavity configured to hold a first smart card that stores one or more sets of information associated with a first account of a user; and
  a second cavity configured to hold a second smart card that stores one or more sets of information associated with a second account of the user;
 a communication interface configured to receive instructions from a transaction terminal;
 a first blocker door configured to allow the first smart card to receive the instructions from the communication interface during a predetermined window of time; and
 a second blocker door configured to prevent the second smart card from receiving the instructions from the communication interface during the predetermined window of time.

15. The smart card wallet of claim 14, wherein the communication interface comprises a first antenna respectively coupled to the first smart card and a second antenna respectively coupled to the second smart card.

16. The smart card wallet of claim 14, wherein the first cavity is further configured to hold a metal contact plate of the first smart card toward the front surface plate; and wherein the second cavity is further configured to hold a metal contact plate of the second smart card toward the back surface plate.

17. The smart card wallet of claim 14, further comprising:
 a cutout through the internal core, the front surface plate, and the back surface plate, the internal core configured to reduce a weight of the smart card wallet.

18. The smart card wallet of claim 17, wherein the first cavity is adjacent to a side of the cutout and the second cavity is adjacent to an opposing side of the cutout.

19. The smart card wallet of claim 14, wherein the front surface plate or the back surface plate comprises:
 a first magnetic stripe configured to store at least one set of the one or more sets of information associated with the first account of the user; and
 a second magnetic stripe configured to store at least one set of the one or more sets of information associated with the second account of the user.

* * * * *